(12) United States Patent
Larson et al.

(10) Patent No.: US 11,418,852 B2
(45) Date of Patent: Aug. 16, 2022

(54) DETECTING LATENCY ANOMALIES FROM PIPELINE COMPONENTS IN CLOUD-BASED SYSTEMS

(71) Applicant: NVIDIA Corporation, Santa Clara, CA (US)

(72) Inventors: Alan Larson, Milpitas, CA (US); Bipin Todur, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 149 days.

(21) Appl. No.: 16/886,192

(22) Filed: May 28, 2020

(65) Prior Publication Data

US 2021/0377623 A1 Dec. 2, 2021

(51) Int. Cl.
*H04N 21/647* (2011.01)
*H04N 21/235* (2011.01)
*H04N 21/239* (2011.01)
*H04N 21/8547* (2011.01)

(52) U.S. Cl.
CPC ..... *H04N 21/64738* (2013.01); *H04N 21/235* (2013.01); *H04N 21/239* (2013.01); *H04N 21/8547* (2013.01)

(58) Field of Classification Search
CPC .......... H04N 21/64738; H04N 21/235; H04N 21/239; H04N 21/8547
USPC ........................................................ 725/116
See application file for complete search history.

(56) References Cited

U.S. PATENT DOCUMENTS

| 10,403,022 | B1* | 9/2019 | Silva ................... H04L 65/4076 |
| 2008/0159287 | A1* | 7/2008 | Nagarajan ............. H04L 47/724 370/392 |
| 2014/0160941 | A1* | 6/2014 | Hui ....................... H04W 24/10 370/241 |
| 2018/0278548 | A1* | 9/2018 | Pignataro ................ H04L 43/18 |
| 2019/0035140 | A1* | 1/2019 | Fricke ....................... G06T 1/20 |
| 2020/0084147 | A1* | 3/2020 | Gandhi ................... H04L 69/22 |

\* cited by examiner

*Primary Examiner* — Alfonso Castro
(74) *Attorney, Agent, or Firm* — Leydig, Voit & Mayer, Ltd.

(57) ABSTRACT

A method, computer readable medium, and system are disclosed for monitoring a pipeline to detect anomalies such as unusual latency associated with a particular stage. Each stage of the pipeline is configured to update metadata associated with content being processed by inserting a time stamp into the metadata when processing of the content is completed by the stage. The server device can collect the metadata from the last stage of the pipeline and analyze the metadata in order to generate metrics for the pipeline, including a residual latency and/or a gain for each stage of the pipeline. In an embodiment, the content is a frame of video to be displayed on a client device after being rendered by a server device, such as through a streaming service (e.g., a video game streaming service). The server device can adjust the pipeline based on the metrics to improve performance.

20 Claims, 20 Drawing Sheets

Major Stutter Analysis

Gain > ~4ms causing Client Present Stutters > ~8ms

| Per-Stage Stutter Analysis | Mean Gain (ms) | 99%ile Gain (ms) | Count Per Minute | Stutter Duration Per Minute (ms) | SDPM Per Minute (%) |
|---|---|---|---|---|---|
| CaptureInput | 17.17 | 44.87 | 220.86 | 3792.88 | 6.32 |
| WaitForFrameGrabEnd | 33.61 | 33.61 | 0.21 | 7.06 | 0.01 |
| CaptureStart | 0 | 0 | 0.0 | 0 | 0.0 |
| CaptureEnd | 151.81 | 544.28 | 0.84 | 127.67 | 0.21 |
| Scale | 0 | 0 | 0.0 | 0 | 0.0 |
| Csc | 8.17 | 8.17 | 0.21 | 1.72 | 0.0 |
| Encode | 62.37 | 70.03 | 0.42 | 26.19 | 0.04 |
| AddFrameToSendQueue | 0 | 0 | 0.0 | 0 | 0.0 |
| WaitForFrameToSend | 0 | 0 | 0.0 | 0 | 0.0 |
| TxTime | 0 | 0 | 0.0 | 0 | 0.0 |
| SendPacketsStart | 0 | 0 | 0.0 | 0 | 0.0 |
| FecEncode0Start | 0 | 0 | 0.0 | 0 | 0.0 |
| FecEncode0End | 0 | 0 | 0.0 | 0 | 0.0 |
| SendPacketsEnd | 0 | 0 | 0.0 | 0 | 0.0 |
| RxTime | 123.69 | 169.16 | 11.35 | 1403.73 | 2.34 |
| DecoderPresent | 111.81 | 1356.84 | 7.99 | 893.07 | 1.49 |
| InFlight | 11.59 | 11.59 | 0.21 | 2.43 | 0.0 |
| RenderPresent | 94.31 | 652.97 | 2.1 | 198.24 | 0.33 |
| RenderStart | 30.37 | 30.37 | 0.21 | 6.38 | 0.01 |
| RenderComplete | 0 | 0 | 0.0 | 0 | 0.0 |
| PresentComplete | 0 | 0 | 0.0 | 0 | 0.0 |
| ClientResync | 24.27 | 33.33 | 9.67 | 234.72 | 0.39 |
| TotalServer | 93.64 | 522.83 | 1.68 | 157.4 | 0.26 |
| TotalPresent | 74.55 | 696.33 | 21.65 | 1614.26 | 2.69 |

*Fig. 14A*

Micro Stutter Analysis

Gain > ~2ms

| Per-Stage Stutter Analysis | Mean Gain (ms) | 99%ile Gain (ms) | Count Per Minute | Stutter Duration Per Minute (ms) | SDPM Per Minute (%) |
|---|---|---|---|---|---|
| CaptureInput | 13.27 | 41.07 | 308.61 | 4095.28 | 6.83 |
| WaitForFrameGrabEnd | 24.64 | 33.43 | 0.42 | 10.35 | 0.02 |
| CaptureStart | 0 | 0 | 0.0 | 0 | 0.0 |
| CaptureEnd | 12.15 | 16.0 | 107.19 | 1302.63 | 2.17 |
| Scale | 0 | 0 | 0.0 | 0 | 0.0 |
| Csc | 8.17 | 8.17 | 0.21 | 1.72 | 0.0 |
| Encode | 5.05 | 60.02 | 13.87 | 70.07 | 0.12 |
| AddFrameToSendQueue | 0 | 0 | 0.0 | 0 | 0.0 |
| WaitForFrameToSend | 0 | 0 | 0.0 | 0 | 0.0 |
| TxTime | 0 | 0 | 0.0 | 0 | 0.0 |
| SendPacketsStart | 0 | 0 | 0.0 | 0 | 0.0 |
| FecEncode0Start | 0 | 0 | 0.0 | 0 | 0.0 |
| FecEncode0End | 0 | 0 | 0.0 | 0 | 0.0 |
| SendPacketsEnd | 0 | 0 | 0.0 | 0 | 0.0 |
| RxTime | 36.98 | 161.2 | 57.6 | 2137.36 | 3.56 |
| DecoderPresent | 17.07 | 167.91 | 78.61 | 1341.76 | 2.24 |
| InFlight | 8.63 | 17.02 | 236.25 | 2038.36 | 3.4 |
| RenderPresent | 8.54 | 26.29 | 102.99 | 879.44 | 1.47 |
| RenderStart | 4.94 | 18.53 | 68.52 | 338.29 | 0.56 |
| RenderComplete | 2.25 | 2.36 | 0.42 | 0.94 | 0.0 |
| PresentComplete | 3.97 | 11.39 | 89.96 | 356.96 | 0.59 |
| ClientResync | 24.27 | 33.33 | 9.67 | 234.72 | 0.39 |
| TotalServer | 10.45 | 16.73 | 141.46 | 1478.35 | 2.46 |
| TotalPresent | 20.41 | 157.92 | 111.4 | 2273.3 | 3.79 |

*Fig. 14B*

| Component | Stream 0 |
|---|---|
| Game | 2/5 - Poor |
| Capture | 3/5 - Okay |
| Encode | 4/5 - Good |
| FecAndSend | 5/5 - Perfect |
| Network | 2/5 - Poor |
| Decode | 2/5 - Poor |
| RenderAndPresent | 3/5 - Okay |
| ClientResync | 4/5 - Good |

DETECTING LATENCY ANOMALIES FROM PIPELINE COMPONENTS IN CLOUD-BASED SYSTEMS

TECHNICAL FIELD

The present disclosure relates to data analytics. More specifically, the embodiments set forth below describe techniques for tracking and analyzing stages of a pipeline.

BACKGROUND

Cloud-based services have been developed for a variety of applications such as network storage, virtual compute resources, and the like. Streaming services such as Netflix® and Hulu® offer a service that delivers video content to a client device such as a television or tablet computer. Streaming video offers certain challenges that require a minimum quality of service (QoS) to ensure a sufficient user experience. For example, low network bandwidth or high network congestion can cause video to be delayed, leading to repeated buffering of the video at the client side that prevents a seamless viewing experience. While the service provider only has some basic tools for dealing with these network issues, such as negotiating exclusive use of network resources with ISPs, the service provider has more control over the software components executing on server devices located in their data centers. In addition, some of these issues can be addressed at the client side, such as by implementing a queue at the client that stores received frames of video and delays playback until a minimum amount of content has been received at the client side. By buffering a number of frames in the queue, any latency caused by a delay of the receipt for a small number of frames can be effectively hidden from the viewer, allowing time for the server or network to catch up.

New cloud-based services are being developed for streaming video games and/or virtual reality/augmented reality systems. Traditionally, video game applications required an application for the game to be executed on the client side, where the rendering of frames for display was performed by the client device, such as using a graphics processing unit included in the client device. As games improved in quality, the minimum hardware requirements of the client device increased, which leads to obsolescence of certain devices, or limits the ability of a game developer to offer high-end graphics for fear that the minimum hardware requirements will be met by too few devices on the market. One solution is to move the rendering of the graphics from the client side to a remote system hosted by the service provider, enabling the service provider to provide the hardware required for rendering the video content, and then deliver the rendered video content to the client side via a network.

However, there are a number of issues with delivering real-time content over a network that cannot be addressed using the same techniques that are employed by conventional streaming services. For example, unlike streaming of video content, game content or VR/AR content is rendered in response to feedback signals from the client side. For example, inputs from a game controller determine how objects or a viewpoint are adjusted for the next frame of the video game. Inputs from sensors in a head-mounted display are used to change the next frame of video in VR/AR systems. There is necessarily some latency in transmitting the feedback signals from the client side to the server side, performing processing on the server side to render video content, and then delivering the video content to the client side for display. If this latency is too long, then the user experience will suffer. For example, a delay of more than 100 ms from a controller input to a visual stimulus related to that input can be referred to as lag, and can be a significant source of frustration for gamers. As another example, a significant delay from a user turning their head to viewing corresponding motion on a head-mounted display can cause physiological reactions such as nausea in a VR/AR application.

Another issue with real-time video streaming services that rely on user inputs can be referred to as stuttering. It can be difficult to ensure a consistent downlink bandwidth using Internet Protocol (IP) packets transmitted over the Internet. In addition, application conditions can change leading to varying render times at the server. This can lead to delay of certain frames. Normal display rates of 60-120 Hz at the client side require each new frame to arrive consistently within 8.3-16.6 ms of the previous frame. If any particular frame is delayed beyond the expected frame duration, then the previous frame may be displayed again and/or certain frames may be skipped when two frames arrive before the next frame is displayed. This can cause stuttering where the video appears to stall or skip forward, and motion in the video content may not be smooth. Basic video streaming services can hide stuttering using a video frame buffer, but real-time applications like game streaming or VR/AR streaming cannot use these buffering techniques.

In order to debug issues with the pipelined stack of the service, a service provider may utilize tools to visualize information related to the various components that make up the service. Conventionally, a client can report delays in the display of frames, such as logging and returning a list of time stamps for each frame received and displayed at the client device. While this information can indicate that there is an issue with the service, it is difficult or impossible to discern from this information whether the issue is located at the server side (e.g., rendering or encoding), within the network during transmission (e.g., network congestion or poor link quality), or located at the client side (e.g., decoding and display). Therefore, new techniques or approaches for monitoring the stages or components in a pipeline are needed.

SUMMARY

A method, computer readable medium, and system are disclosed for monitoring a pipeline for a cloud-based service. The pipeline can include a number of stages, where at least one stage is implemented on a server device of the cloud-based service and at least one additional stage is implemented on a client connected to the cloud-based service via a network.

In a first aspect of the present disclosure, a system is described for monitoring latency variability in a pipeline of a cloud-based service. The system includes a server device including one or more processors. The server device is configured to: receive, from a client device, metadata corresponding to content processed by a plurality of stages of the pipeline; generate, for each stage of the plurality of stages of the pipeline, a metric calculated based on the metadata; and adjust a parameter associated with at least one stage of the pipeline based on the metrics for the plurality of stages. The metadata includes information corresponding to each stage of the plurality of stages of the pipeline.

In some embodiments, the content comprises a plurality of frames streamed to the client device during a session. The one or more processors are further configured to: calculate, for each frame of the plurality of frames, a gain for each stage of the pipeline; compare, for each frame of the plurality of frames, a total residual latency to a first threshold value to identify anomalous frames; and calculate, for each stage of the pipeline, an aggregate value by summing a number of anomalous frames in the plurality of frames where the gain corresponding to the stage in the anomalous frame is greater than a second threshold value. The one or more processors can further be configured to generate a visual representation based on the metrics. The metric for a particular stage is calculated based on the aggregate value for the particular stage.

In an embodiment, the gain for a particular stage is calculated based on an expected frame duration and a difference between a time stamp corresponding to the particular stage for the current frame and a time stamp corresponding to the particular stage for a previous frame. In an embodiment, the pipeline generates the plurality of frames in accordance with a variable frame rate, and the expected frame duration is set in accordance with a target frame rate.

In an embodiment, the metric for a particular stage is calculated by multiplying a rate of the gain for the particular stage exceeding the second threshold value by a mean of the gain for the particular stage over a duration of the session.

In some embodiments, the content comprises a frame of video rendered in response to a feedback signal received from the client device. In an embodiment, the frame of video is rendered in accordance with a ray-tracing algorithm. In some embodiments, the feedback signal includes at least one signal selected from the group consisting of: controller input; or sensor data from a head-mounted display.

In some embodiments, adjusting the parameter causes an encoding stage or a decoding stage of the pipeline to use a different encoding configuration or a different codec for encoding or decoding the content.

In some embodiments, the information corresponding to each stage of the pipeline comprises a time stamp that indicates a time when the processing of the content by the stage is complete. In other embodiments, each stage includes one or more components and at least one stage includes a plurality of components. Information corresponding to a particular stage of the pipeline comprises a time stamp for each component of the particular stage that indicates a time when the processing of the content by the component is complete.

In some embodiments, the pipeline includes at least one stage selected from the group consisting of: a frame capture stage, an encoding stage, a forward error correction (FEC) stage, a transmit stage, a network stage, a decoding stage, a resynchronization stage, or a display stage.

In an embodiment, the client device is configured to train a neural network for an autonomous vehicle. The server device is operable to generate simulated camera signals, representative of camera signals captured by the autonomous vehicle, in response to control inputs received from the autonomous vehicle.

In another aspect of the present disclosure, a method is disclosed for monitoring a pipeline. The method includes the steps of: receiving, from a client device, metadata corresponding to content processed by a plurality of stages of a pipeline, generating, for each stage of the plurality of stages of the pipeline, a metric calculated based on the metadata; and adjusting a parameter associated with at least one stage of the pipeline based on the metrics for the plurality of stages. The metadata includes information corresponding to each stage of the plurality of stages of the pipeline.

In yet another aspect of the present disclosure, a non-transitory computer-readable media storing computer instructions is disclosed. The instructions, when executed by one or more processors, cause the one or more processors to perform the steps comprising: receiving, from a client device, metadata corresponding to content processed by a plurality of stages of a pipeline, generating, for each stage of the plurality of stages of the pipeline, a metric calculated based on the metadata; and adjusting a parameter associated with at least one stage of the pipeline based on the metrics for the plurality of stages. The metadata includes information corresponding to each stage of the plurality of stages of the pipeline.

BRIEF DESCRIPTION OF THE DRAWINGS

FIGS. 14A & 14B illustrate a visualization of a session analysis chart, in accordance with some embodiments.

DETAILED DESCRIPTION

A pipeline for a cloud-based service is configured to track processing of content within the pipeline by updating metadata corresponding to the content. Each stage of the pipeline can insert a time stamp into the metadata when processing of the content is completed by the stage. The client device, upon receiving the content and metadata, can update the metadata for any stages of the pipeline that are implemented by the client device and then transmit the updated metadata back to the server device.

The server device can analyze the metadata from a number of instances of the content in order to identify residual latency and a gain for each stage of the pipeline for each pass of an instance of the content. In an embodiment, the content is a frame of video to be displayed on the client device after being rendered by the server device. The server device can also implement a dashboard that generates visualization of the metadata or statistics derived from the metadata. The visualization can be presented to a developer via a client such as a web browser application. The developer can use the information in the visualization to find and debug issues and guide changes to the pipeline.

In some embodiments, the server device analyzes the metadata and updates the parameters of the pipeline to improve a Quality of Service delivered by the cloud-based service. In an embodiment, the server device can identify stages of the pipeline associated with large residual latency or gain and update a parameter of the stage to improve performance of the stage. For example, the parameter can cause the server device to utilize a different codec in an encoding stage of the pipeline. This functionality enables the pipeline to dynamically adjust to the latency in the pipeline.

Figure 1:
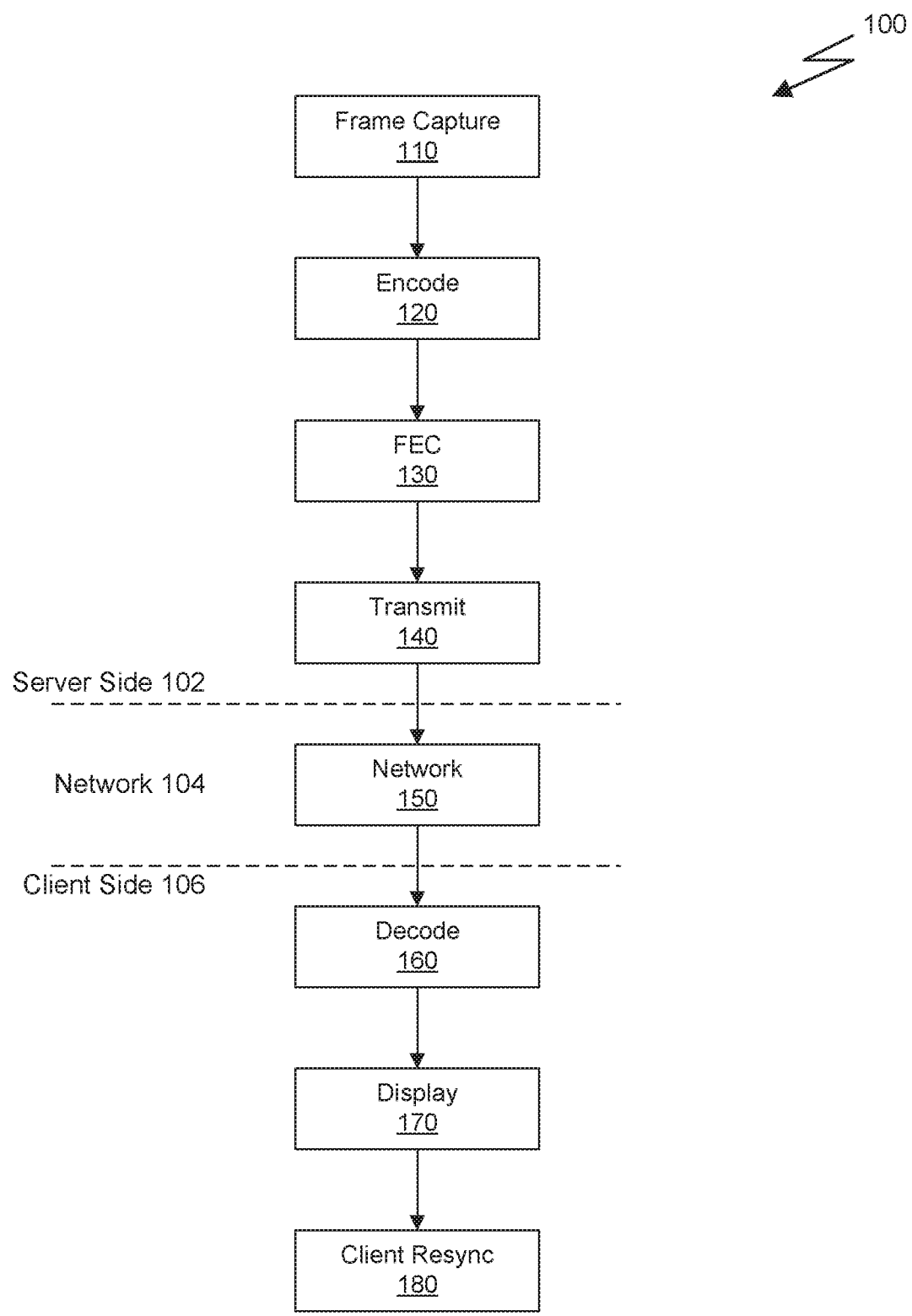
FIG. 1 illustrates a pipelined stack for a cloud-based service, in accordance with some embodiments.

FIG. 1 illustrates a pipelined stack 100 for a cloud-based service, in accordance with some embodiments. The cloud-based service is implemented as a pipelined stack 100 of a plurality of stages. Each stage includes one or more components, and the output of one stage is received at the input of a subsequent stage, with the exception of the last stage. As depicted in FIG. 1, a pipelined stack 100 for a cloud-based, game streaming service includes a number of stages. The server side 102 implements a number of stages on one or more server devices, the stages including a frame capture stage 110, an encoding stage 120, a forward error correction (FEC) stage 130, and a transmit stage 140. The pipelined stack 100 also includes a network stage 150 that encompasses the transmission of data packets over a network 104 from the server side 102 to the client side 106. The network stage 150 is performed on one or more network devices, such as network routers, switches, access points, or the like. The client side 106 implements a number of stages on one or more client devices, the stages including a decoding stage 160, a display stage 170, and a client resynchronization (resync) stage 180.

It will be appreciated that the exemplary pipelined stack 100 for a game streaming service is depicted in FIG. 1 for purposes of illustration of the various techniques described herein. In other embodiments, the particular arrangement of stages in the pipelined stack 100 can be different, such as by including additional stages not shown in FIG. 1 or omitting stages that are shown in FIG. 1. For example, the FEC stage 130 may be omitted where FEC is not implemented by the service. In addition, some implementations may combine aspects of two or more stages into a single stage (e.g., FEC and transmit may be combined into a single stage of the pipelined stack 100).

Each stage shown in FIG. 1 can include one or more components. For example, the encoding stage 120 can include a queue component that asynchronously receives frames from the frame capture stage 110 while a previous frame is being encoded by an encoder component. The encoding stage 120 can also include a send queue component that asynchronously receives encoded frames from the encoder component and transmits the encoded frames to the FEC stage 130 when the encoded frames are available and the FEC stage 130 is ready. As will be discussed in more detail, metadata for the content processed by the stages of the pipelined stack 100 can be updated by each stage or, alternatively, by each component within the stage.

In an embodiment, the content includes one or more frames and metadata is generated for each frame. As used herein, a frame can refer to a data structure that encodes image data for display on a display device. The frame can include an array of pixel values, where each pixel value includes one or more channels of color information. For example, the pixel values can include a red channel, a blue channel, and a green channel that indicates, via 8 or 10 bits, for example, a color of the pixel. Of course, in other embodiments, the pixel values can be encoded in a different format such as by encoding luminance and chrominance information in separate channels. In some embodiments, each component or stage of the pipelined stack 100 can be configured to update metadata corresponding to the processed frame by adding a time stamp to the metadata when that stage/component has finished processing the frame. The metadata is then forwarded to the next component/stage along with the processed content.

At the end of the pipelined stack 100, the client device transmits the metadata back to the server device for storage and/or analysis. In an embodiment, the metadata for a frame returned to the server device comprises a plurality of time stamps, each time stamp corresponding to a time that indicates the completion of processing for the frame by a particular stage or component of a stage. In some embodiments, the client device is configured to collect metadata for a plurality of frames (e.g., 60 seconds of video at 30-60 frames per second) in a data structure (e.g., a file) before transmitting the data structure to the server device. In such embodiments, the server device collects files for a number of sessions, each session amounting to, e.g., a number of seconds of video. It will be appreciated that the size of a session can be adjusted to match a desired size of the collected metadata, such as by collecting 30 minutes to 60 minutes worth of metadata in a session. In some embodiments, the client device collects the metadata in a circular buffer such that the metadata collected for the session is only the metadata for the last n frames in the session. For example, a circular buffer having a size suitable for collecting 10 minutes of data at 60 frames per second (e.g., 36,000 frames worth of metadata) can continuously collect metadata during a session, overwriting the oldest metadata as the session extends past 10 minutes in length. At the end of the session (e.g., when a game application is terminated), the client device can encode and transmit the contents of the circular buffer to the server device. It will be appreciated that, when a user experiences issues that degrade the user experience, the session will likely be terminated early and, as such, the last m minutes of a session (corresponding to n frames) are usually sufficient to highlight the cause of the issue that degraded the user experience. In other embodiments, the circular buffer can exist in the server side of the pipeline. The client device can be configured to send metadata for each frame back to the server device, which is then stored in the circular buffer. At the end of the session, the server device can process the contents of the circular buffer stored. In yet other embodiments, the metadata added by each stage of the pipeline can be stripped by the server device and stored temporarily at the server device such that the metadata is not forwarded to the client device along with the content. The stages of the pipeline at the client device then generate new metadata as the content is processed on the client side of the pipeline and the metadata is encoded and transmitted to the server device when the content is done being processed at the client device. The metadata from the client device is then combined with the corresponding metadata from the server device and stored in the circular buffer at the server device. It will be appreciated that any technique for collecting metadata at the server device, including having each stage transmit the corresponding metadata for that stage back to the server device individually, is within the scope of the present disclosure.

Figure 2A:
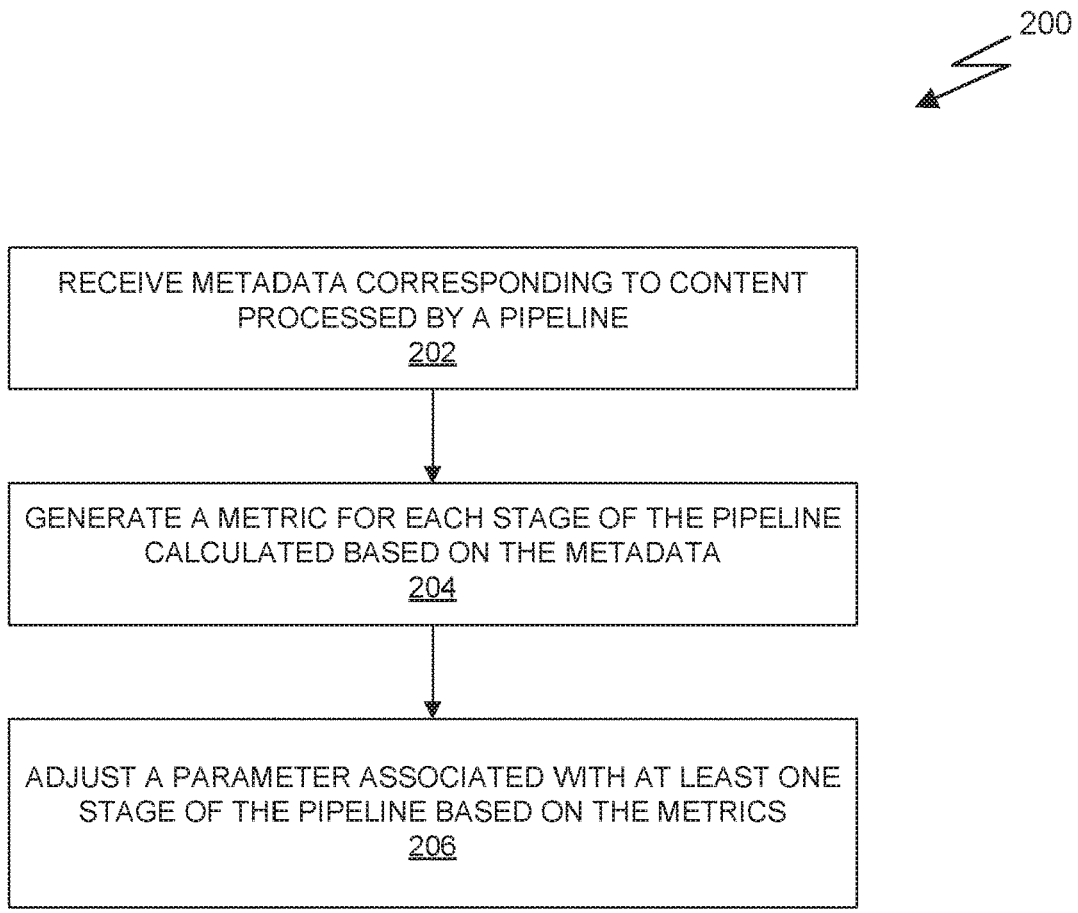
FIG. 2A illustrates a flowchart of a method for detecting latency anomalies in a pipeline, in accordance with some embodiments.

FIG. 2A illustrates a flowchart of a method 200 for detecting latency anomalies in a pipeline, in accordance with some embodiments. The method 200 is described in the context of software executed by one or more processors. In some embodiments, the method 200, at least in part, can be performed by instructions executed by a server device, which may be the same or separate from a server device that implements at least one stage of the pipelined stack 100. In other embodiments, the method 200 can be performed by hardware or some combination of hardware and software.

At step 202, metadata corresponding to content processed by a plurality of stages of the pipeline is received from a client device. The metadata includes information corresponding to each stage of the plurality of stages of the pipeline. In an embodiment, each stage of the pipeline is configured to update the metadata to add a time stamp that indicates a time when the processing of the content by the stage is complete.

At step 204, a metric is generated for each stage of the pipeline based on the metadata. In an embodiment, the metrics include a gain calculated for each stage of the pipeline, where the gain is calculated based on a difference in time stamps for two instances of the content and an expected duration of time between the two instances of the content.

At step 206, a parameter associated with at least one stage of the pipeline is adjusted based on the metrics for the plurality of stages. In some embodiments, the configuration of the pipeline is adjusted by changing the configuration of one or more stages of the pipeline, such as, but not limited to, adjusting a configuration of an encoding stage or a decoding stage, or changing a codec utilized by the encoding stage or decoding stage. Other parameters that can be adjusted, depending on the type of pipeline implemented for a specific application, include adjusting a frame rate or resolution of a streaming video, adjusting a process (e.g., adjusting a supply chain for an automated assembly line), or adjusting a schedule (e.g., adjusting a number or frequency of delivery drivers or bus routes).

Figure 2B:
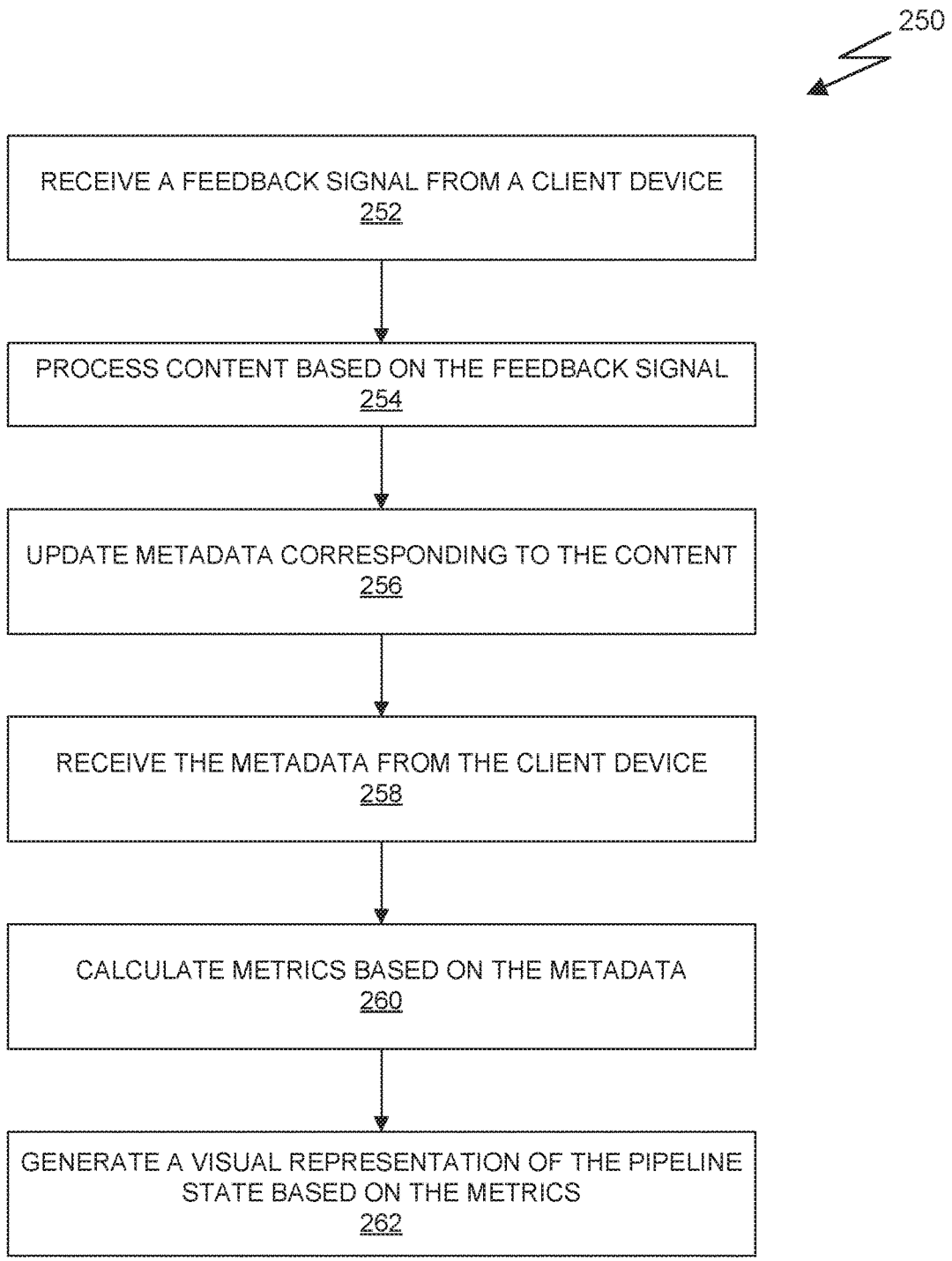
FIG. 2B illustrates a flowchart of a method for monitoring a pipeline, in accordance with some embodiments.

FIG. 2B illustrates a flowchart of a method 250 for monitoring a pipeline, in accordance with some embodiments. The method 250 is described in the context of software executed by one or more processors. In some embodiments, the method 250, at least in part, can be performed by instructions executed by a server device configured to implement at least one stage of the pipelined stack 100. In other embodiments, the method 200 can be performed by hardware or some combination of hardware and software.

At step 252, a feedback signal is received from a client device. In an embodiment, the feedback signal represents controller input collected by a client application executed by the client device. For example, a game controller including one or more joysticks and one or more buttons can provide user feedback to the client application representing the state of each of the joysticks and/or buttons. Alternately, a keyboard and/or mouse device can provide keystrokes and motion data/button state to the client application. In another embodiment, the feedback signal is related to sensors in a head-mounted display (e.g., gyroscopes, accelerometers, etc.). The client application transmits the feedback signal to the server device.

At step 254, the pipeline processes content based on the feedback signal. In an embodiment, the content is a frame of video rendered by at least one stage of the pipeline executed by a server device. In some embodiments, the server device utilizes, at least in part, a parallel processing unit to render each frame. The parallel processing unit can implement a ray-tracing algorithm to generate pixel values for each frame. Alternatively, the parallel processing unit can render the frames using a raster-based rendering algorithm executed within a graphics processing pipeline. In an embodiment, the content includes frames of video for a video game streaming service. In another embodiment, the content includes frames of video for a head-mounted display associated with a VR/AR application. It will be appreciated that the content can be any content based on the feedback signal.

In some embodiments, the content has a real-time requirement such as a maximum latency between receiving the feedback signal and the content being delivered to the client device. The maximum latency can be, e.g., related to a multiple of a frame rate of display on a client device (e.g., N times the frame duration of 16.7 ms for 60 Hz display rate, where N is an integer greater than one). In some embodiments, the maximum latency is specified in terms of milliseconds and is not limited to an integer multiple of the frame rate. The real-time requirement can be defined as a Quality of Service (QoS) requirement, and can be set based on a subjective or objective measurement of user experience. The real-time requirement is a goal of the end-to-end delivery of the content and not a guarantee, as certain portions of the pipeline may be implemented on hardware that is not controlled by the service provider, such as network devices or the client device.

At step 256, metadata corresponding to the content is updated. In some embodiments, the metadata is updated by each stage of the pipeline. The metadata can include identifier information that includes a frame number and/or a session identifier. In an embodiment, the metadata is updated by adding a time stamp to the metadata when the processing the content by each stage of the pipeline is complete. In other words, the time stamp can indicate a time corresponding to the completion of the processing by that stage in the pipeline, and the time stamp is generated and added to the metadata responsive to completion of the processing.

In some embodiments, the first stage of the pipeline creates a data structure for the metadata with identifier information upon receipt of the content and updates the metadata to include a first time stamp upon completion of the processing of the content. In some embodiments, the first stage of the pipeline may also generate a time stamp that indicates a time when processing the content by the stage of the pipeline is commenced (e.g., when the content is received by the first stage of the pipeline). This initial time stamp can be used to identify a total time that the content was processed by the pipeline.

In some embodiments, all stages of the pipeline on the server side of the pipeline are executed by a single server device, and transmitting the content and the metadata to the next stage of the pipeline is performed by transmitting a pointer to the content and/or metadata in a memory of the server device to a software module or process that implements the next stage. In other embodiments, each stage of the pipeline can be implemented by a different server device within a single data center or multiple data centers. In such embodiments, the content and/or metadata can be transmitted from one server device to another server device over the network.

At step 258, the metadata received at a server device. In an embodiment, the metadata for each frame is transmitted by the client device back to the server device once the pipeline has completed the processing of the frame. In another embodiment, the metadata for multiple frames is collected and sent back to the server device at the termination of the session or after a threshold number of frames worth of metadata has been received by the client device.

At step 260, metrics are calculated based on the metadata. In an embodiment, the metrics can include a gain and/or a residual latency per stage of the pipeline, for each instance of content processed by the pipeline. For example, in some embodiments, the content comprises a plurality of frames streamed to the client device during a session. In such embodiments, the metrics can be calculated by: calculating, for each frame of the plurality of frames, a gain for each stage of the pipeline; comparing, for each frame of the plurality of frames, a total residual latency to a first threshold value to identify anomalous frames; and calculating, for each stage of the pipeline, an aggregate value by summing a number of anomalous frames in the plurality of frames where the gain corresponding to the stage in the anomalous frame is greater than a second threshold value. The metric for a particular stage is calculated based on the aggregate value for the particular stage. In an embodiment, the gain for a particular stage is calculated based on an expected frame duration and a difference between a time stamp corresponding to the particular stage for the current frame and a time stamp corresponding to the particular stage for a previous frame. In some embodiments, the pipeline generates the plurality of frames in accordance with a variable frame rate, and the expected frame duration for calculating the gain is set in accordance with a target frame rate. In some embodiments, the metric for a particular stage is calculated by multiplying a rate of the gain for the particular stage exceeding the second threshold value by a mean of the gain for the particular stage over a duration of the session, which can be referred to herein as a stutter duration per minute (SDPM) metric. It will be appreciated that the given metrics selected for the pipeline can depend on the particular application and the desired performance sought to be adjusted.

At step 262, a visual representation is generated based on the metrics. In an embodiment, the server device can implement a dashboard application that allows a client device to view the visual representation in an application such as a web browser application or a mobile application. The visual representation can quickly allow a developer to view the state of the pipeline and/or assess whether a particular session associated with a user experienced latency anomalies that could be indicative of poor performance of the pipeline stages. The metrics, calculated at a per-stage level of granularity and for each instance of the content processed by the pipeline (e.g., each frame) allow for a particularly detailed view of the pipeline operation that enables a developer to pinpoint the particular stages that are responsible for the performance issues, enabling the developer to address the root cause of the problem.

It will be appreciated that the method 250 is described above with time stamps being updated at the end of each stage. In some embodiments, where each stage includes one or more components, the method 250 can be extended such that the metadata is updated at the completion of each component to provide more fine-grained information.

It will be appreciated that the stages of the pipeline stack 100 and/or the steps of the method 200 or 250 are implemented by at least one of: one or more server devices, one or more network devices, and/or a client device. Each of a server device, a network device, and a client device includes at least a processor, a memory, and a network interface. The processor can include a conventional programmable processor such as a central processing unit. Alternatively, the processor can include a reduced instruction set computer (RISC) such as an ARM processor or a system on a chip (SoC) that includes one or more CPU cores and one or more GPU cores on a single integrated circuit or a plurality of integrated circuits included in a package on package (PoP) device. In some embodiments, especially for stages tasked with performing frame rendering operations or other types of operations that can benefit from a parallel architecture such as single instruction, multiple data (SIMD) or single instruction, multiple thread (SIMT) processor architectures, the processor can include a parallel processing unit (PPU) or tensor processor.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 3:
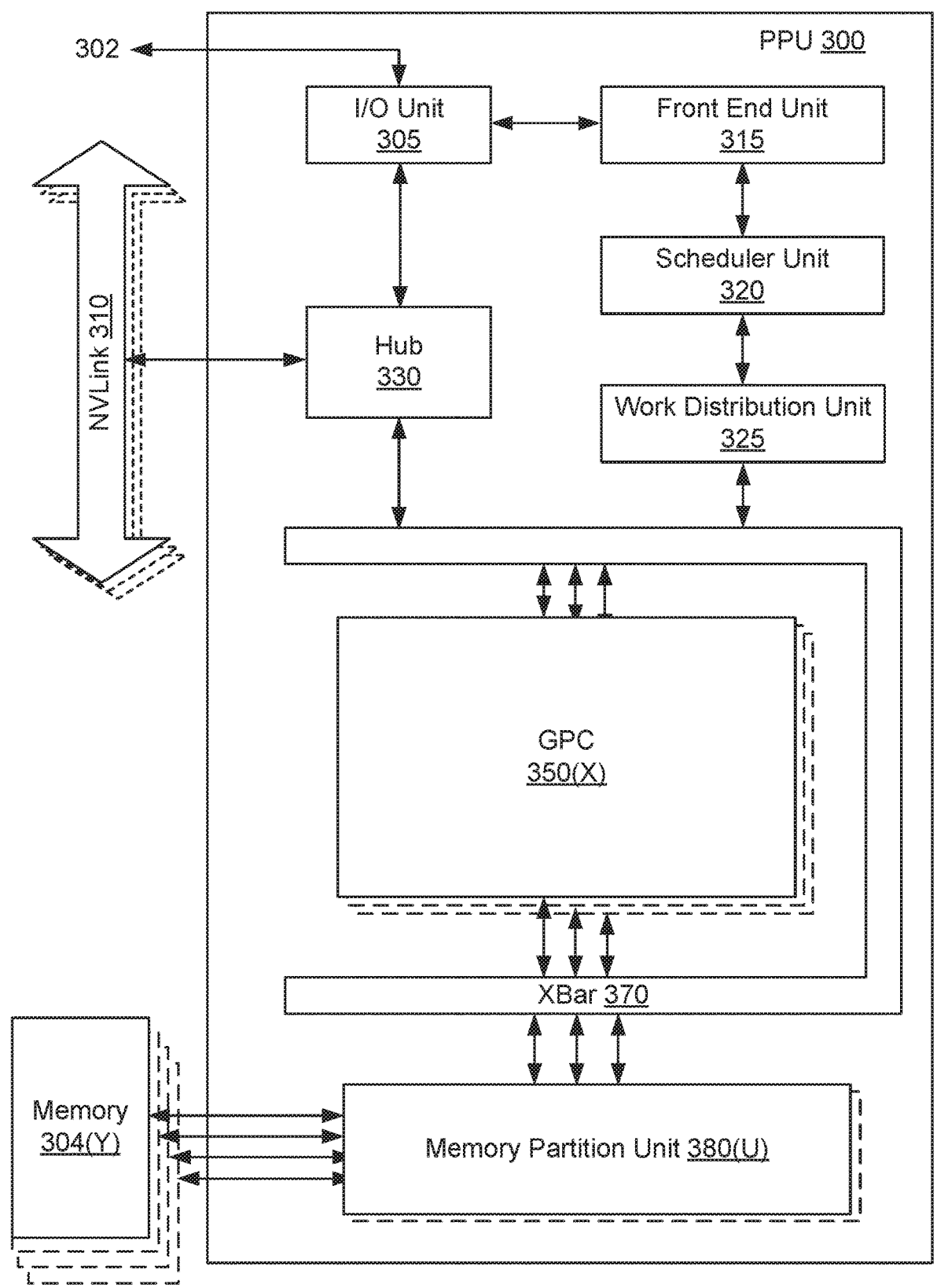
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
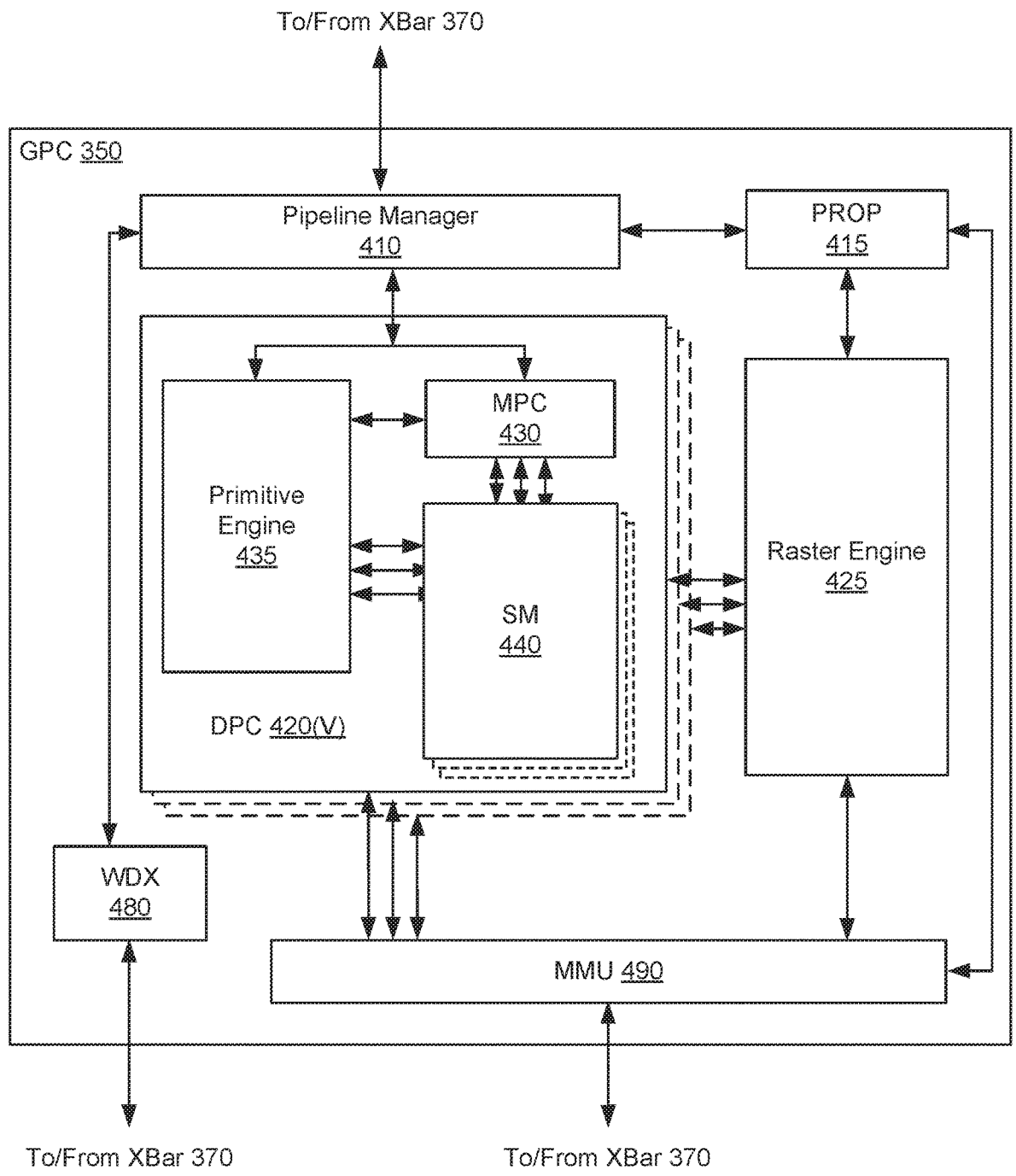
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
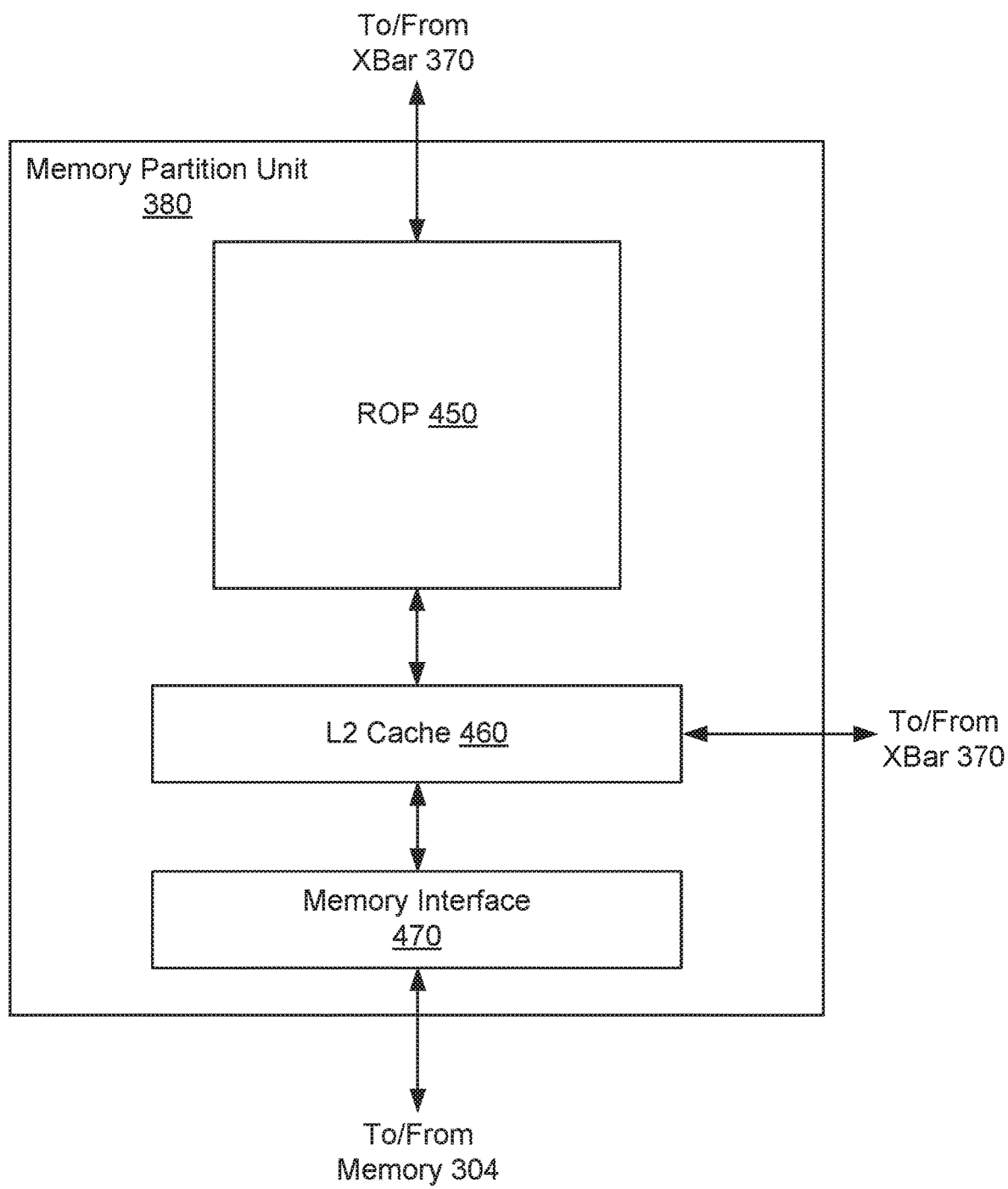
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
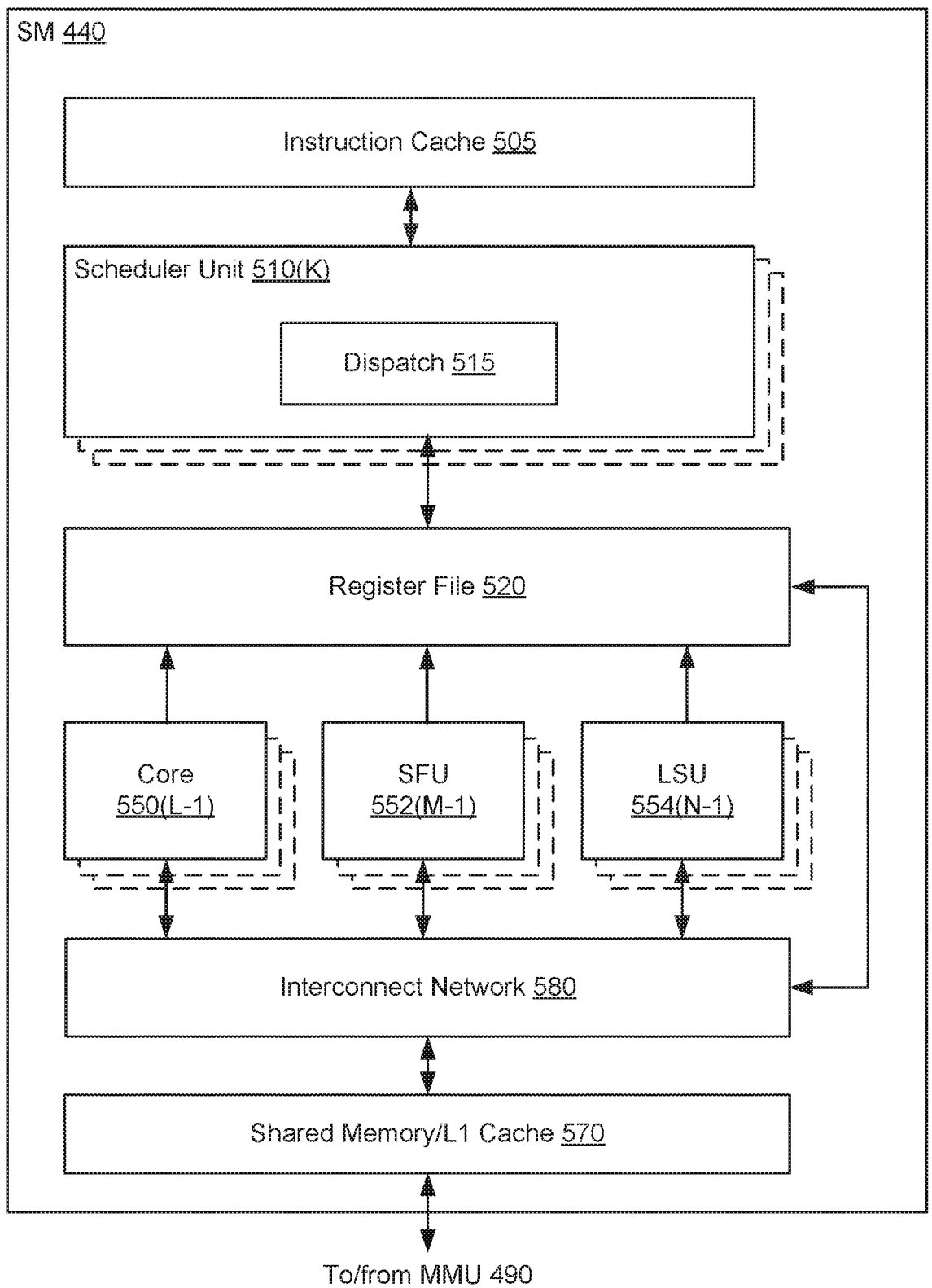
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture units configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
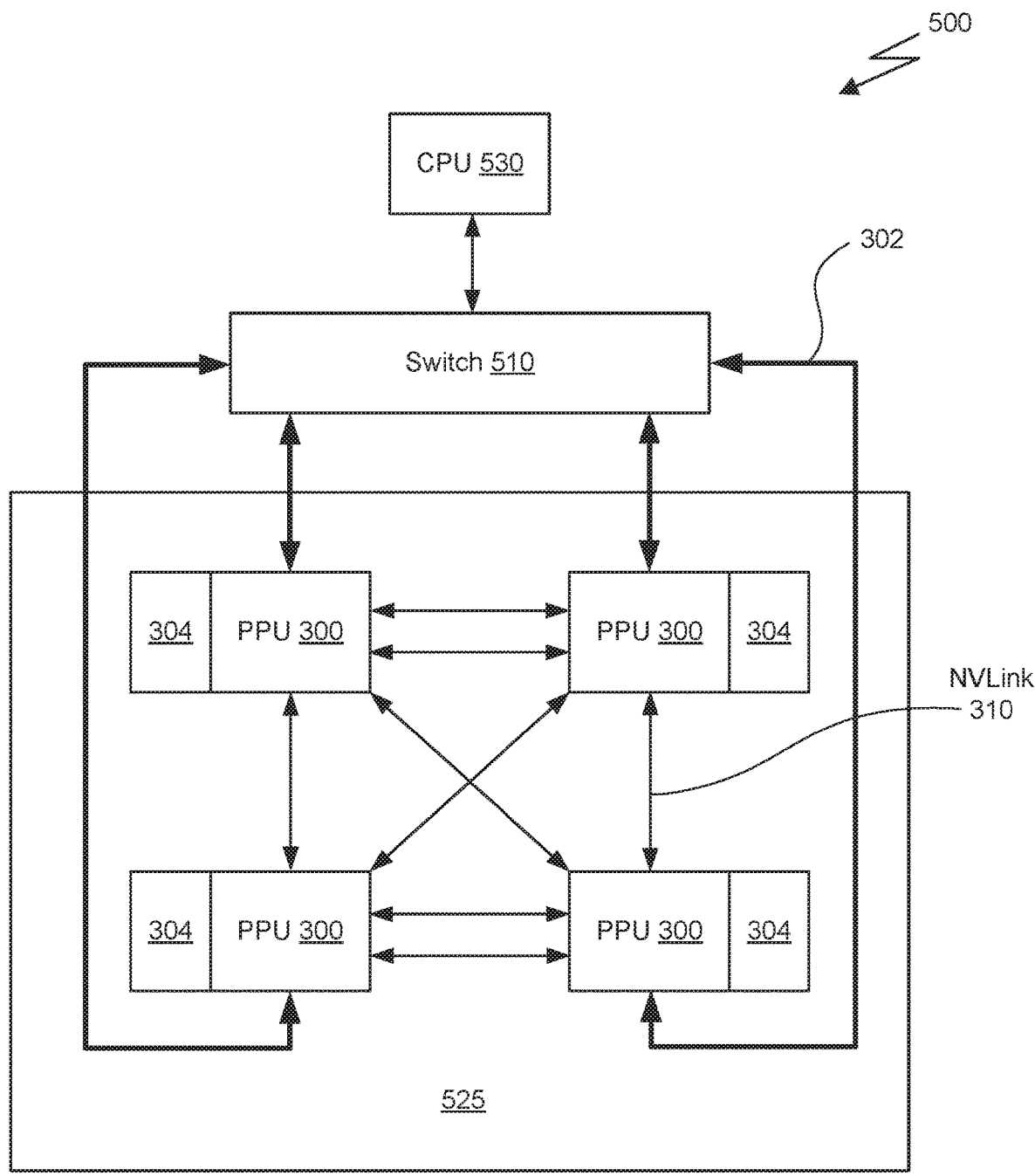
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
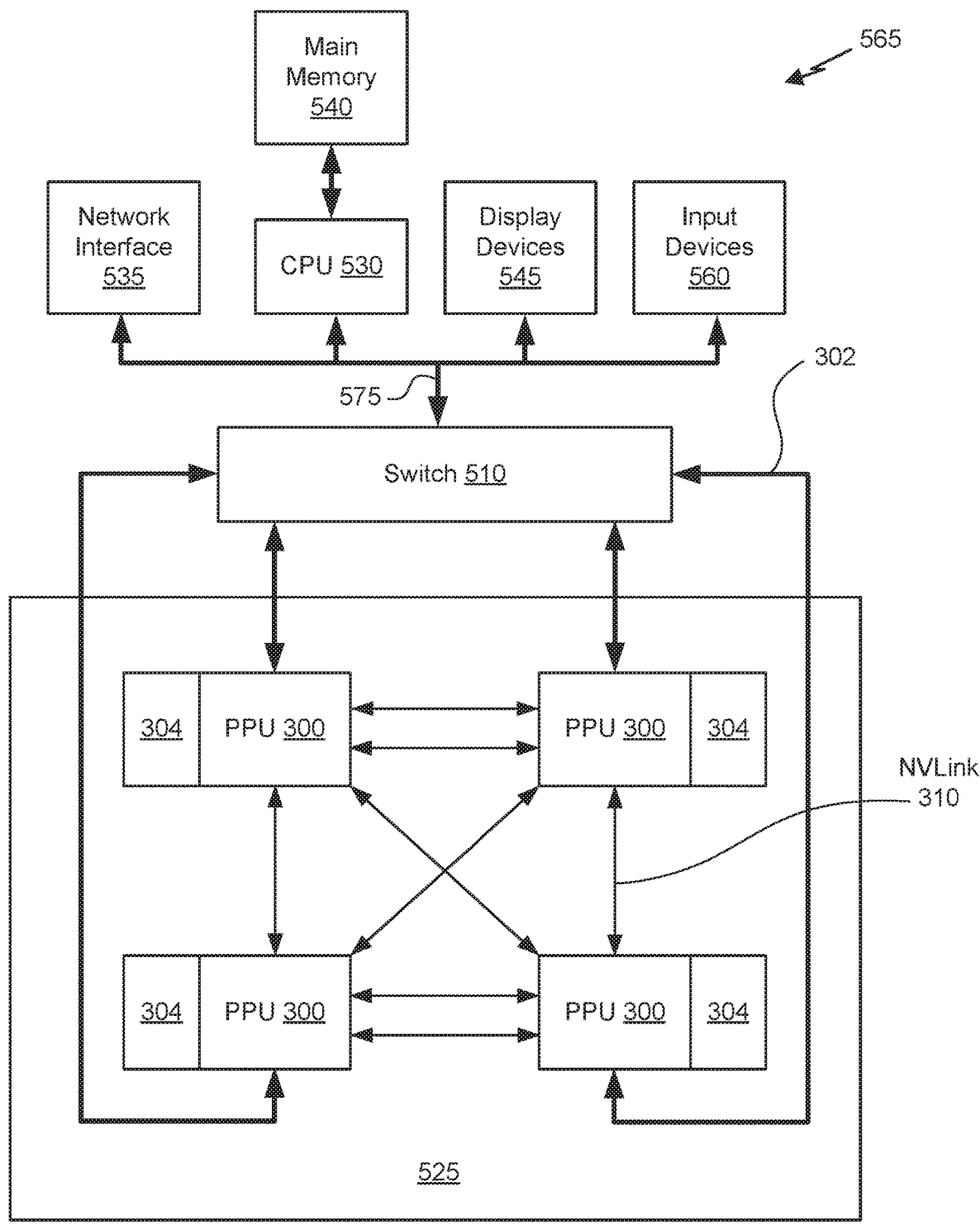
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
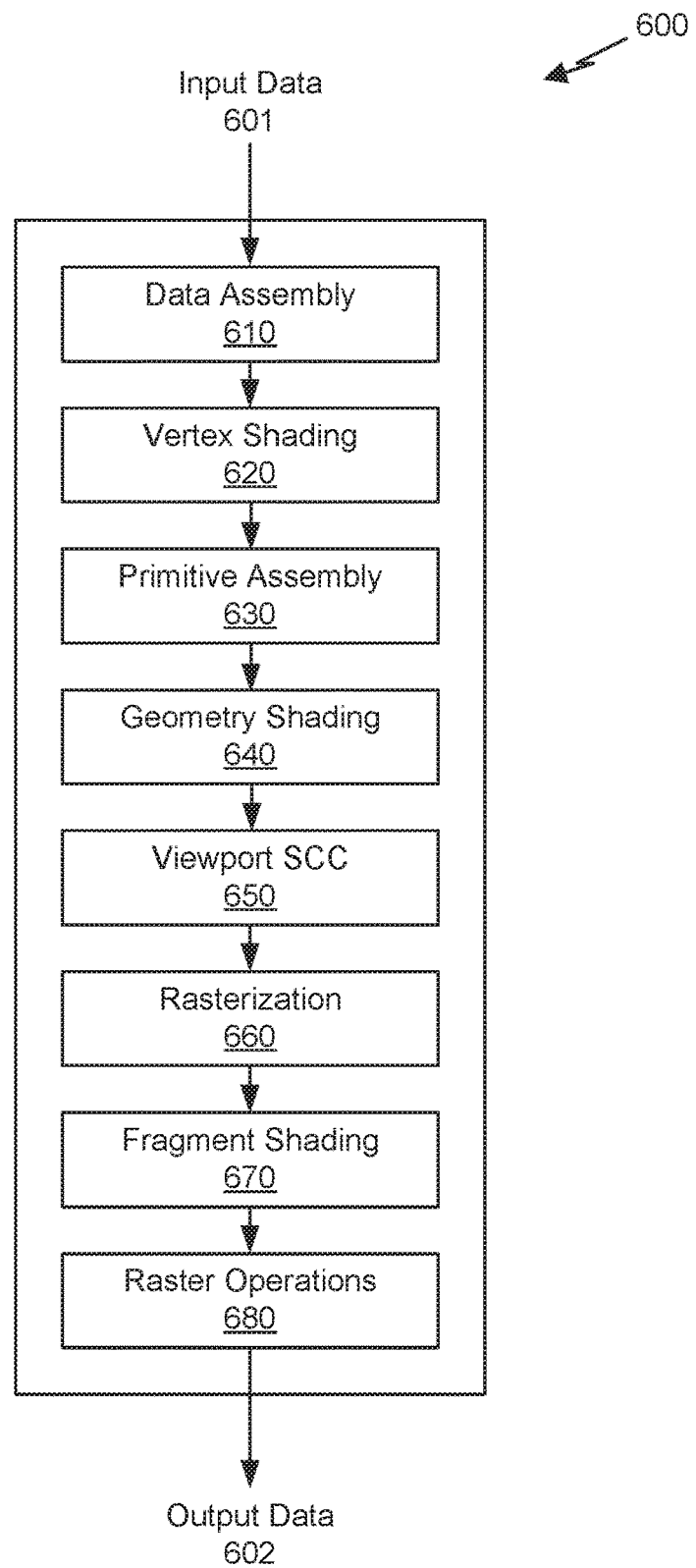
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Rendering Via Ray-Tracing

Although rendering tasks are commonly implemented using raster-based rendering techniques, some algorithms for performing rendering utilize light transport simulation referred to as ray-tracing. Ray-tracing algorithms simulate the interaction of light with virtual objects in a scene in order to calculate colors for pixels of an image. Rays are cast into the scene for each pixel of the image as defined by a viewport and a virtual camera position. Effects such as diffuse and specular reflection, refraction, absorption, and the like can be simulated at each interaction of a ray with a virtual object by casting new rays from the intersection point of the ray with the virtual object. As a ray interacts with a light source, the light path from the virtual camera to the light source can be traced to determine a color of light passing through the pixel corresponding to ray. An aggregate color from a plurality of rays passing through the pixel can be calculated to generate a color for the pixel of the image.

In some embodiments, the PPU 300 can be utilized to render an image in accordance with various ray-tracing techniques. For example, ray casting can be implemented for a number of rays in parallel by executing a plurality of threads on one or more SMs 440. Each thread compares the parameters for a ray to a representation of the virtual objects in the scene to determine whether the ray intersects a virtual object. In some embodiments, the representation of the virtual objects comprises a bounding volume hierarchy, which is used to efficiently determine whether a ray intersects with any virtual objects in the scene. Rays determined to intersect a virtual object can generate one or more new rays corresponding to a second plurality of threads executed by the SMs 440 in order to simulate lighting effects. When a ray intersects a light source, then the chain of rays from the virtual camera to the light source is identified as a light path, and the color of the pixel can be calculated for the light path.

Ray-tracing algorithms can be used to produce realistic computer-generated images. Such algorithms have been utilized for producing animated feature films or television programs, simulated images for commercial applications (e.g., images included in brochures or catalogs), and the like. Although ray-tracing was traditionally too complex for real-time applications, advancements in processing capacity and the underlying algorithms has made real-time ray-tracing practical in some applications.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Detecting Latency Anomalies in the Pipeline

Figure 7:
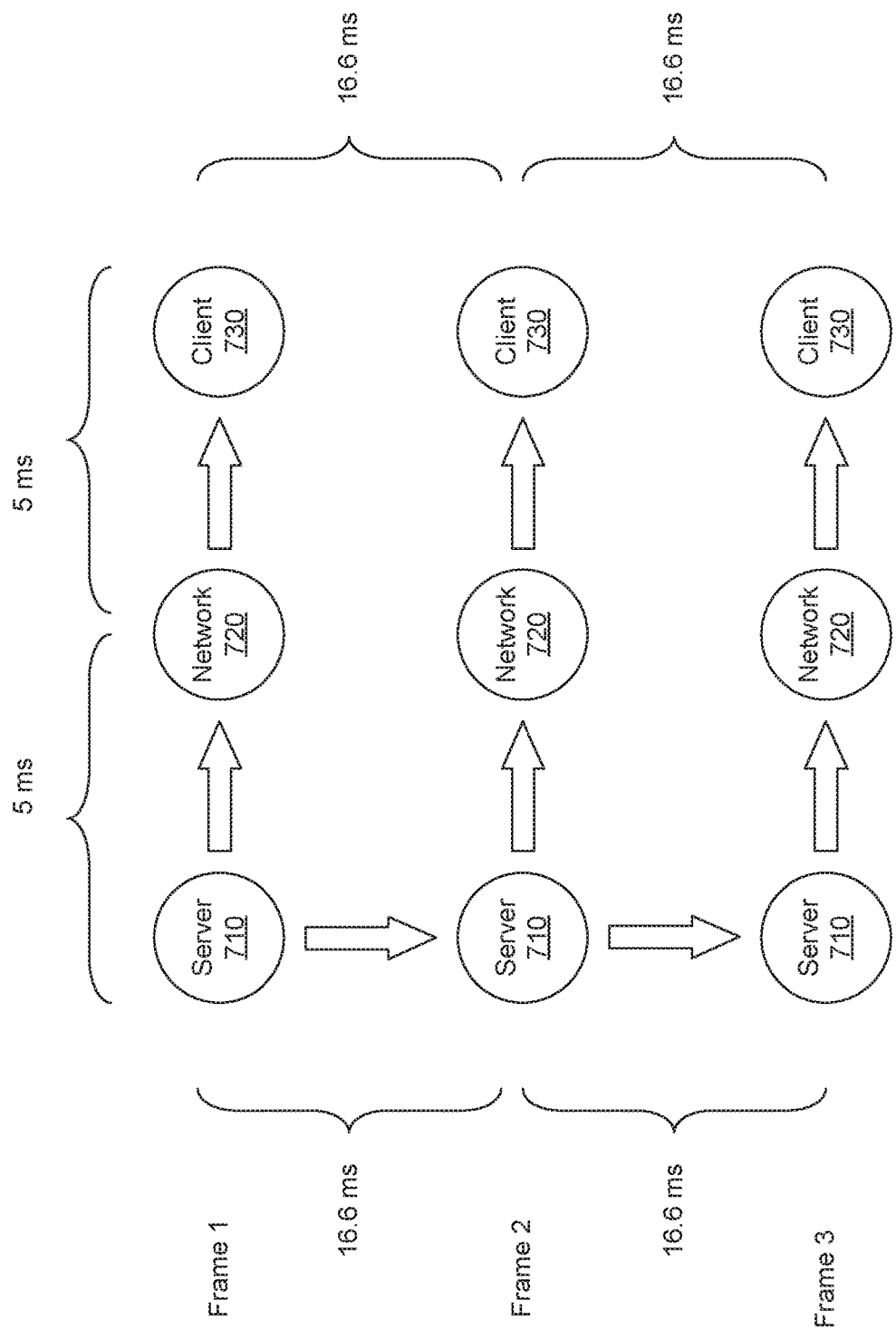
FIG. 7 illustrates ideal latency in a pipeline of a cloud-based service, in accordance with some embodiments.

FIG. 7 illustrates ideal latency in a pipeline of a cloud-based service, in accordance with some embodiments. As depicted in FIG. 7, a server device 710 processes content and transmits the content via the network 720 to a client device 730. There may be 5 ms of latency between starting the processing of the content on the server device 710 and transmitting the content via the network 720 to the client device 730. There may also be 5 ms of latency between receiving the content at the client device 730 and completing the processing of the content at the client device 730 (e.g., display of the frame). It will be appreciated that FIG. 7 is simplified for illustrative purposes. For example, there will also be some latency associated with the transmission over the network 720. Given that FIG. 7 illustrates the ideal latency in the pipeline, we can assume that such latency is constant and small due to, e.g., a small number of hops in the network 720 and perfect connectivity (i.e., no network congestion, 100% delivery rate of packets, etc.).

Each frame is processed by the server device 710 every 16.6 ms, corresponding to a 60 Hz frame rate. Each frame is also displayed at the client device 730 every 16.6 ms. However, the time between when rendering of a frame is initiated at the server device 710 and displayed at the client device 730 is at least 10 ms. Even though there is 10 ms of latency in the pipelined stack 100 of the cloud-based service, the frame rate at the client side 106 is consistent at one frame every 16.6 ms. Thus, the video is displayed at the intended frame rate of 60 Hz.

Figure 8:
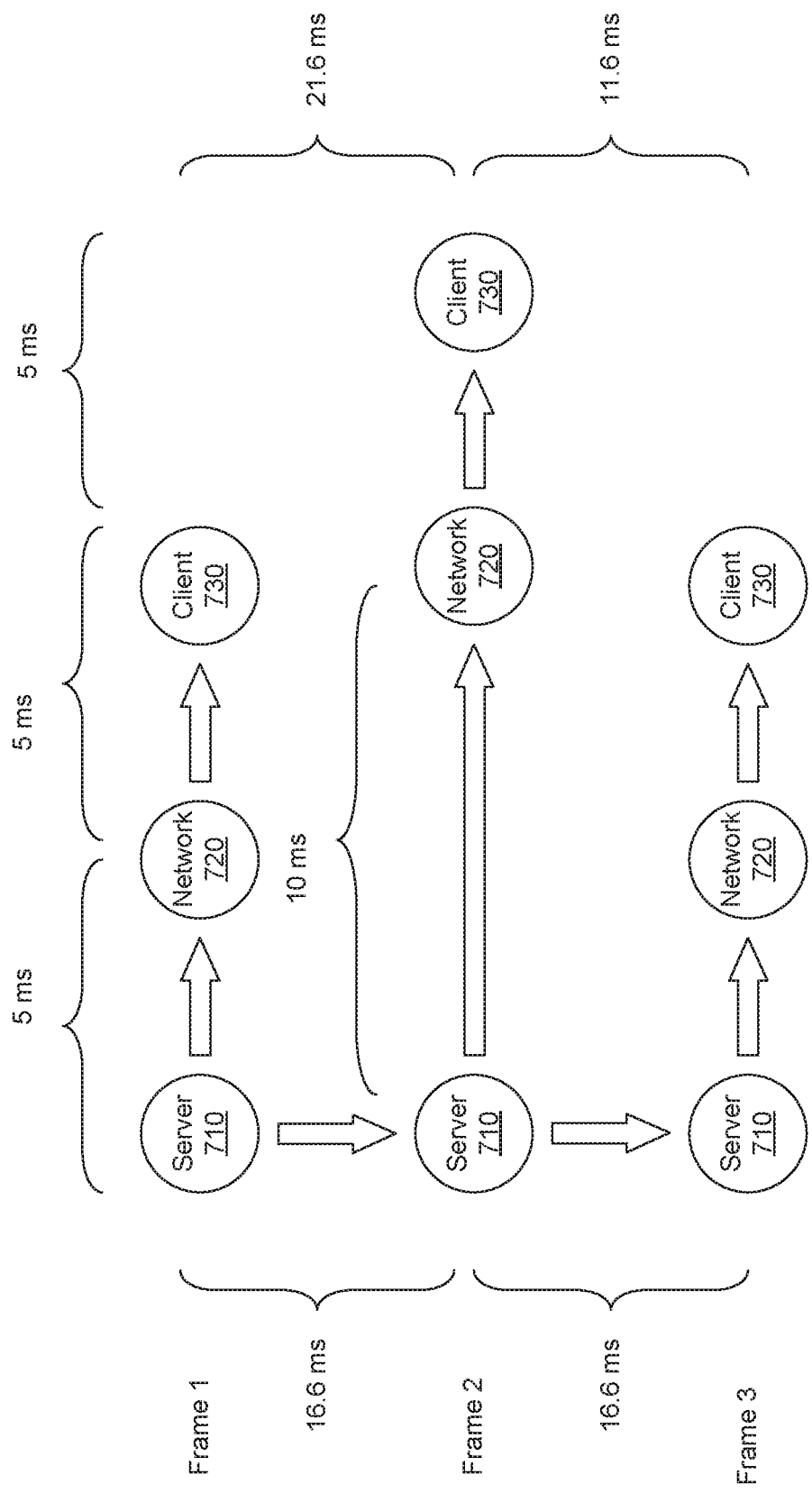
FIG. 8 illustrates a stutter caused by latency variability of the cloud-based service, in accordance with some embodiments.

FIG. 8 illustrates a stutter caused by latency variability of the cloud-based service, in accordance with some embodiments. As depicted in FIG. 8, the first frame is delivered as expected 10 ms after the server device 710 initiates processing. The second frame begins the rendering process 16.6 ms after the first frame on the server device 710. However, the second frame experiences some latency in the network 720 that increases the latency to deliver the content to the client side from 5 ms to 10 ms, which increases the latency of the second frame by 5 ms. This increase in latency causes the second frame to be delayed, at the client side, which increases the time between the first frame and the second frame from an expected 16.6 ms to 21.6 ms. In such cases where the second frame arrives later than the start of the next frame period, the client device 730 can be configured to display the first frame twice.

The third frame begins rendering at the server device 710 16.6 ms after the second frame. The third frame experiences the same latency as the first frame, e.g., 10 ms and is delivered and ready to be displayed 11.6 ms after the second frame was ready to be displayed. The total time between display of the first frame and the third frame is 33.2 ms, which corresponds to the start of the third frame period. Because both the second frame and the third frame are ready to be displayed, the client device 730 can be configured to discard the second frame and display the third frame. More specifically, the three frame periods correspond to displaying the first frame, displaying the first frame a second time, and displaying the third frame. The result is that a viewer experiences a stutter in the video stream at the client side 106.

Figure 9:
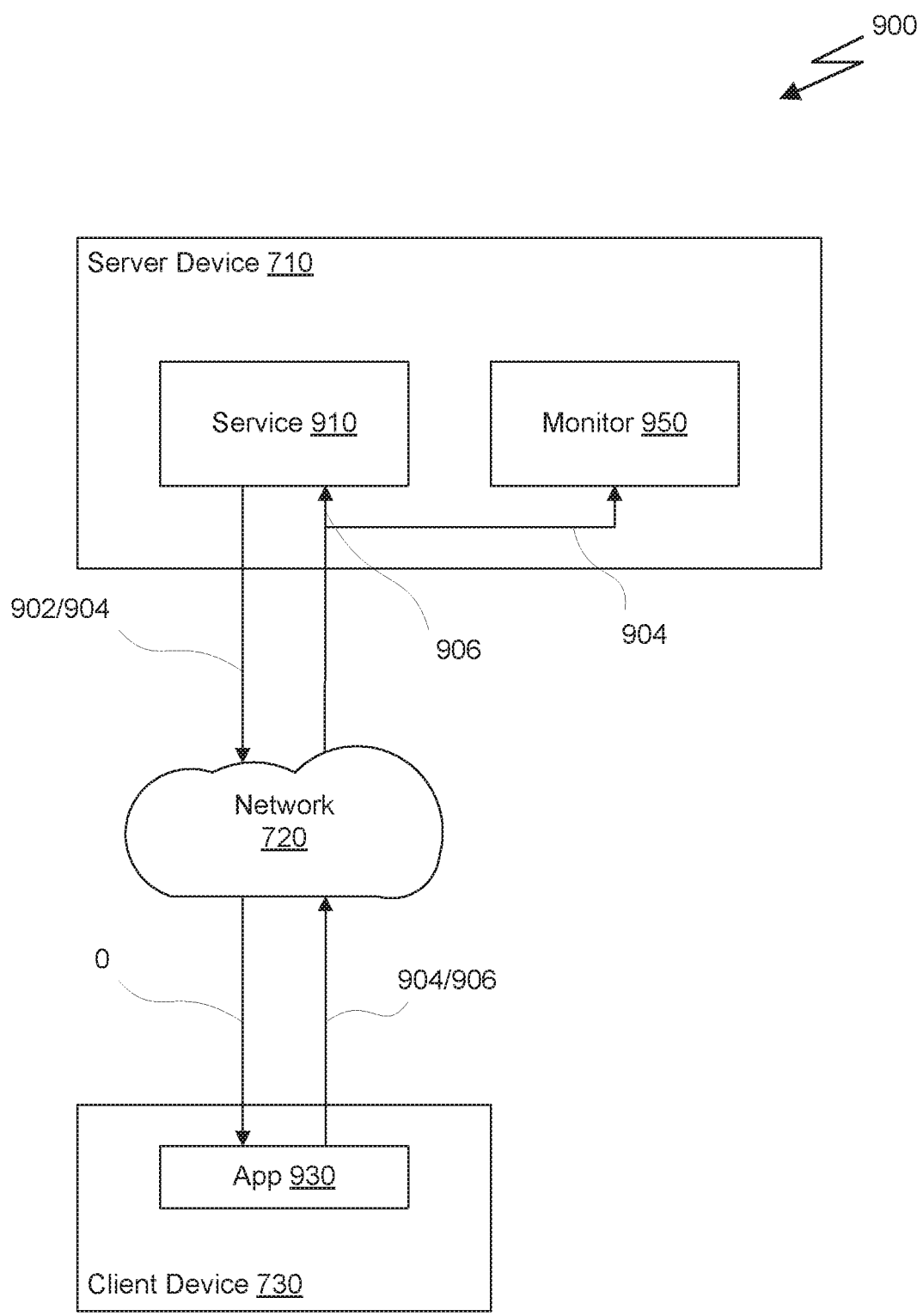
FIG. 9 illustrates a client-server architecture for monitoring the pipeline stack of a cloud-based service, in accordance with some embodiments.

FIG. 9 illustrates a client-server architecture 900 for monitoring the pipeline stack of a cloud-based service 910, in accordance with some embodiments. As depicted in FIG. 9, a server device 710 is in communication with a client device 730 via a network 720. In an embodiment, both the server device 710 and the client device 730 include network interface controllers (NIC) that enable the client device 730 to establish a connection with the server device 710. The client device 730 and/or the server device 710 can establish a tunnel through the network 720 for delivery of data packets that include content 902 and metadata 904 for the cloud-based service 910.

In an embodiment, the cloud-based service 910 includes one or more stages of a pipelined stack, such as pipelined stack 100. The client device 730 includes a client application 930 that includes one or more stages of the pipelined stack 100. The client device 730 is configured to transmit the metadata 904 for the content back to the server device 710. In one embodiment, the metadata 904 is sent with a feedback signal 906 (e.g., controller input, sensor data, etc.) utilized to generate new content for the client device 730. The metadata 904 is received by a monitor 950 that is configured to analyze end-to-end performance of the pipelined stack 100 as well as the performance of each stage of the pipelined stack 100 and/or each component of each stage of the pipelined stack 100.

In an embodiment, the monitor 950 is configured to analyze the metadata 904 to extract information that is useful for debugging. First, the time stamps corresponding to each frame can be used to identify the elapsed time for processing the content 902 within each stage (or component of each stage) to identify the stages or components of the pipelined stack 100 that are the predominant drivers of latency. Developers can use this information to streamline the pipeline by looking for efficiency improvements in the code. For example, if a particular encoding scheme is taking too long to process, then alternative encoding schemes can be explored to attempt to speed up the overall latency of the pipelined stack 100.

Second, a new statistical measure referred to as per-stage gain can be calculated by comparing timestamps temporally (e.g., from one frame to the next). The variability in latency can be referred to as a residual latency for a stage. In one embodiment, a residual VALUE $R_i$ for stage i and frame number n can be calculated as follows:

$$R_i(n) = TS_i(n) - TS_i(n-1) - D_{exp}, \quad \text{(Eq. 1)}$$

where $TS_i(n)$ is the time stamp for the $n^{th}$ frame added to the metadata 904 by the $i^{th}$ stage of the pipelined stack 100, $TS_i(n-1)$ is the time stamp for the previous frame, and $D_{exp}$ is the expected frame delta (e.g., 16.6 ms for 60 Hz). The gain $G_i$ for a given stage can be either positive or negative and reflects a frame over frame deviation from an expected frame duration.

$$G_0(n) = R_0(n) \quad \text{(Eq. 2)}$$

$$G_i(n) = R_i(n) - R_{i-1}(n) \quad \text{(Eq. 3)}$$

where $G_0$ refers to the residual latency at the start of the pipeline (e.g., the difference from an expected delay between the start of processing the current frame and the previous frame), and $G_i$ is the per-stage gain for the $i^{th}$ stage, which is computed as a difference between the residual latency for the current stage and the residual latency for the previous stage.

The total residual latency for the pipeline, $R_S$, can be obtained either by a sum of the gains across all stages for that frame or the residual latency for the last stage of the pipelined stack 100, given as follows:

$$R_S(n) = \sum G_j(n) = TS_N(n) - TS_N(n-1) - D_{exp}, \quad (Eq. 4)$$

where S equals the number of stages in the pipelined stack 100. This allows for a direct understanding of how much each stage contributes to an increase in residual latency on the final stage. It will be appreciated that the per-stage gain can be positive or negative and indicates whether a given stage is increasing or decreasing the residual latency of the pipelined stack 100.

Table 1, below, shows pseudocode for identifying stages that are a root cause of an anomaly such as stutter. The monitor 950 can execute instructions for identifying stages that are the root cause of the anomaly by executing software that implements the functionality of the pseudocode.

TABLE 1

```
ExpectedFrameInterval[n] = 1000.0 / FPS[n]
For (each stage in the pipeline) {
    i: current stage number       // i={1,2,...,S}
    n: current frame number
    Th_1: 8.33 ms                 // Threshold for anomaly
    Th_2: 4 ms                    // Threshold for a stage as source
    Delta[i][n] = Timestamp[i][n] - Timestamp[i][n-1]
    Delta[i-1][n] = Timestamp[i-1][n] - Timestamp[i-1][n-1]
    Residual[i][n] = Delta[i][n] - ExpectedFrameInterval[n]
    Residual[i-1][n] = Delta[i-1][n] - ExpectedFrameInterval[n]
    Gain[0][n] = Residual[0][n]
    Gain[i][n] = Residual[i][n] - Residual[i-1][n]
}
For (each Frame n) {
    If (Delta[S][n] - ExpectedFrameInterval[n] > Th_1)
        Mark Frame as Anomaly
}
Count[i] = 0
For (each Frame n marked as Anomaly) {
    For {each stage i in the pipeline) {
        If (Gain[i][n] > Th_2)
            Count[i]++
    }
}
MeanGain[i] = 0
For (each Frame n) {
    MeanGain[i] += Gain[i][n]
}
MeanGain[i] /= N              // N is total frames per session
SessionDuration = Timestamp[0][n] - Timestamp[0][0]
CountsPerMinute[i] = Count[i] / SessionDuration
StutterDurationPerMinute[i] = CountsPerMinute * MeanGain[i]
```

The monitor 950 identifies frames as anomalies when the total delta for time stamps corresponding to two sequential frames exceeds the expected frame period (e.g., Delta[S][n]-ExpectedFrameInterval[n]) by a first threshold value. It will be appreciated that the pseudocode in Table 1 describes, for each stage in the pipeline, counting frames in which anomalies occur based on a comparison of the per-stage gain for the frame with a second threshold value, which is less than the first threshold value. This identifies stages that could be a major contributing source of the total residual latency for a frame. Statistical measures of the operation of the pipeline are calculated including, a mean gain per stage, a counts per minute that indicates a rate that a stage is a major contributor to the latency, and stutter duration per minute which is a measure of the severity of the latency over time. Stutter duration per minute, and intermediate aggregates thereof, can help differentiate between stages with low frequency of occurrence but higher disruption (larger latency delta) and stages with higher frequency of occurrence but lower disruption (smaller latency delta).

In an embodiment, the thresholds can be set manually based on an analysis of the application. In another embodiment, the monitor 950 can be configured to adjust the gains automatically. For example, the monitor 950 can adjust the gains up or down to capture a desired amount of anomalies as a percentage of total frames in order to ensure that the anomaly is defined relative to the average operation of the pipeline rather than a specific threshold corresponding to a QoS requirement, for example.

In an embodiment, the monitor 950 can implement a dashboard. The dashboard refers to an application that generates graphical user interfaces that can be transmitted to a client device. For example, the dashboard can refer to a number of web-based applications that can be accessed via a browser application of a client device. The monitor 950 generates dynamic hypertext markup language (HTML) pages that are transmitted to the client device and viewed in the web browser application. The HTML page can include images (e.g., graphs or charts) that show the results of the statistical information calculated by the monitor 950. For example, each frame marked as including an anomaly can be plotted in a chart, or each stage that has a gain above a threshold value can be plotted on a chart. The dashboard enables a developer to quickly identify issues in the pipelined stack 100 of the cloud-based service. Various examples of the visualizations that can be generated by the monitor 950 are discussed below.

Figure 10:
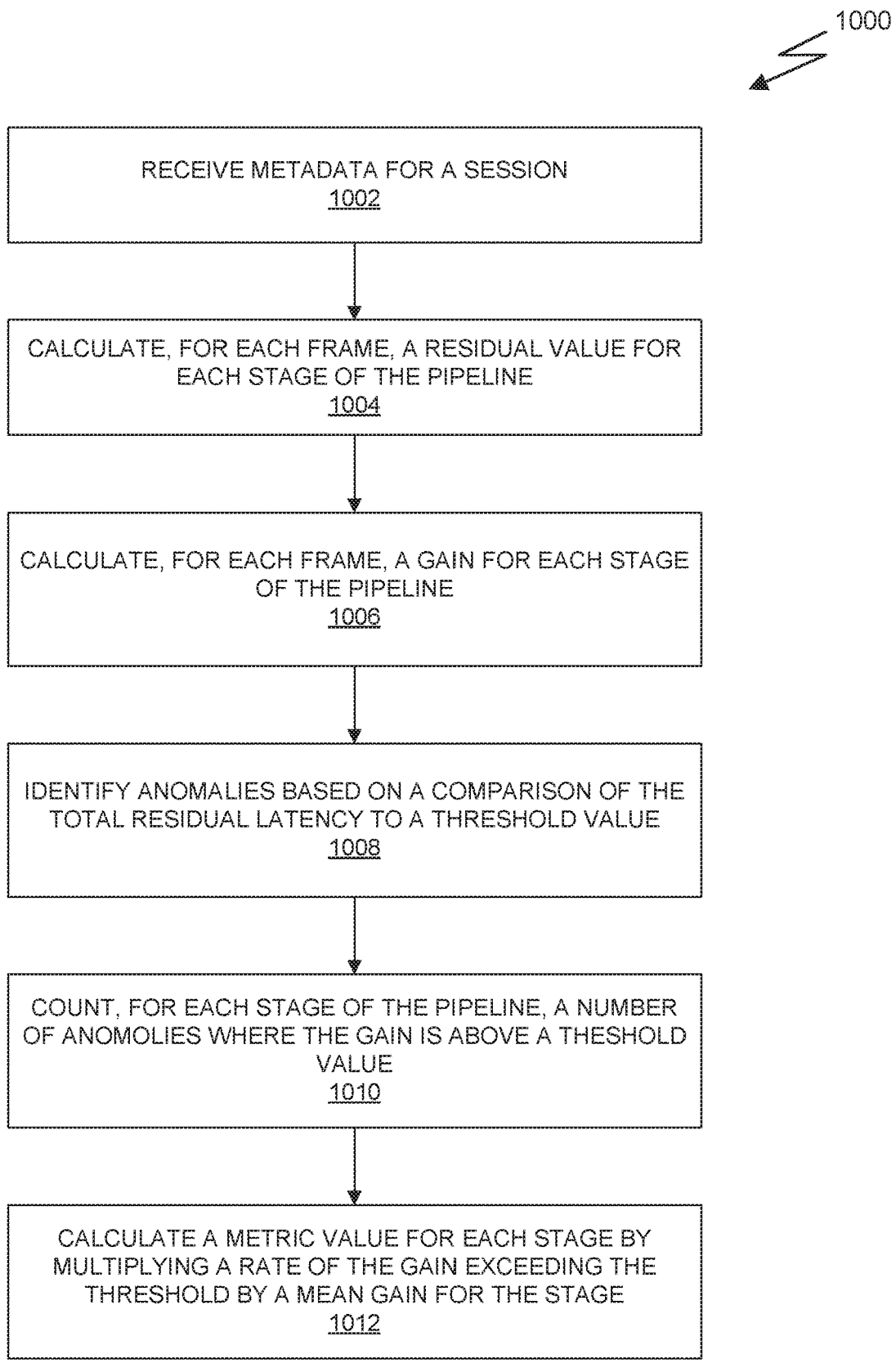
FIG. 10 is a flowchart of a method for analyzing the metadata, in accordance with some embodiments.

FIG. 10 is a flowchart of a method for analyzing the metadata, in accordance with some embodiments. The method 1000 is described in the context of software executed by one or more processors. In some embodiments, the method 1000, at least in part, can be performed by instructions executed by a server device 710. In other embodiments, the method 1000 can be performed by hardware or some combination of hardware and software.

At step 1002, metadata associated with a pipeline is received. In one embodiment, the metadata comprises information corresponding to a number of frames of video processed by the pipeline. The metadata can include, for each of a plurality of frames, a set of time stamps that indicate when each stage of the pipeline completed processing of the frame.

At step 1004, a residual value is calculated for each stage of the pipeline. The residual latency value refers to a difference between a measured interval and an expected interval for a particular stage of the pipeline. The expected interval refers to an average rate that instances of the content are processed by the pipeline. In an embodiment, the residual latency values are calculated for each frame in a plurality of frames processed by the pipeline.

At step 1006, a gain is calculated for each stage of the pipeline. The gain refers to a difference in the residual latency value for a stage in the pipeline and the residual latency value for a previous stage in the pipeline, for the current instance of the content. In an embodiment, the gains are calculated for each frame in the plurality of frames processed by the pipeline.

At step 1008, anomalies are identified based on a comparison of a total residual latency with a threshold value. In an embodiment, an anomaly is identified for a current frame based on a comparison of the total residual latency for the frame to a threshold value. In an embodiment, the total residual latency for a current frame refers to a difference between time stamps for a last stage in the pipeline between the current frame and a previous frame.

At step 1010, a number of anomalies are counted where the gain is above a threshold value. In an embodiment, a counter for each stage of the pipeline is initialized. For each frame identified as having an anomaly, the counter for a particular stage is incremented if the gain for the particular stage is above a threshold value.

At step 1012, a metric value is calculated for each stage of the pipeline. The metric value can be calculated by multiplying a rate of the gain exceeding the threshold by a mean gain for the stage. In an embodiment, the mean gain refers to summing all of the gains for a stage for each of N frames and then dividing by N. The rate of the gain exceeding the threshold is equal to the value of the counter for the stage divided by a duration of the session for the N frames.

Figure 11:
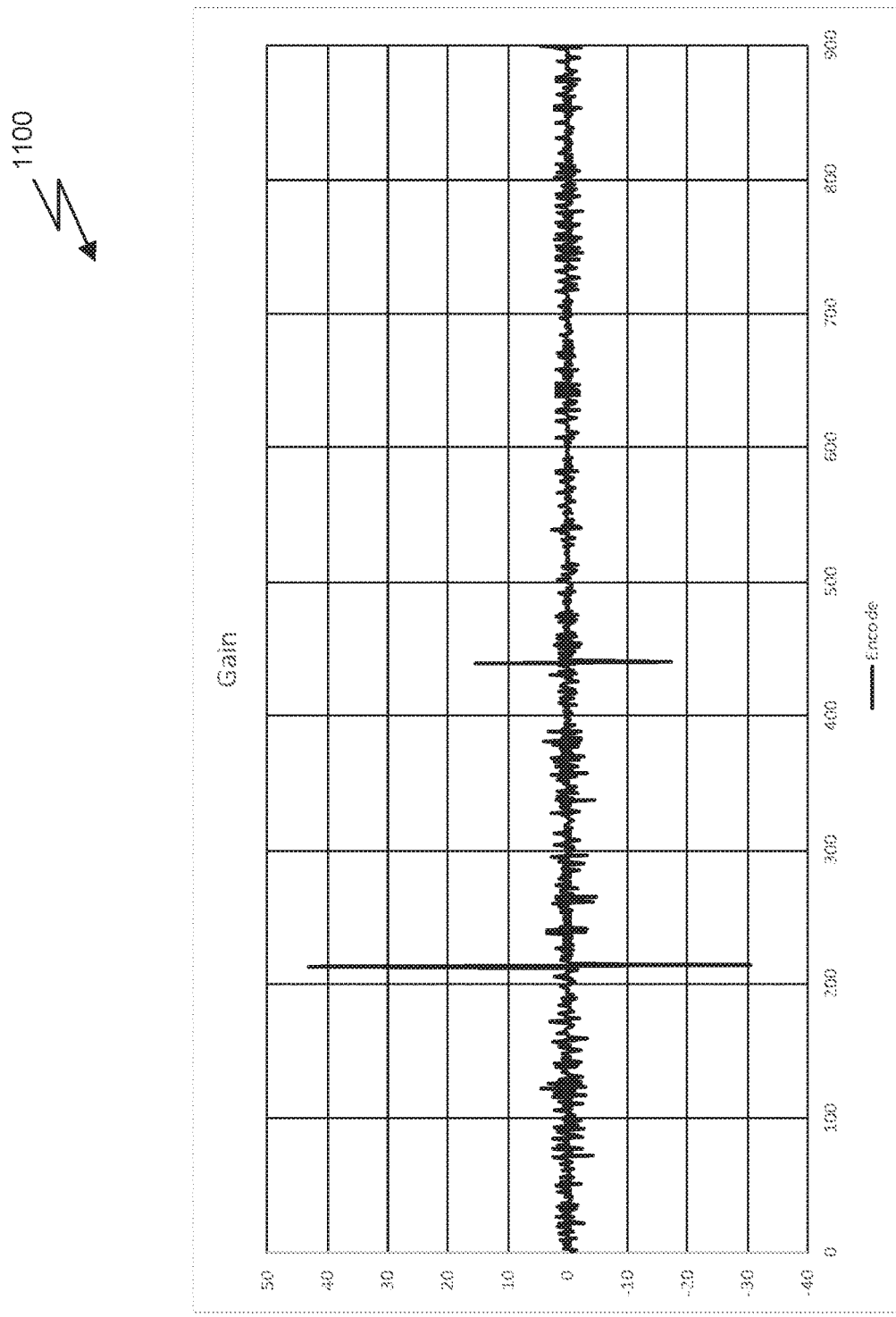
FIG. 11 illustrates a visualization of the per-stage gain during a session, in accordance with some embodiments.

FIG. 11 illustrates a visualization 1100 of the per-stage gain during a session, in accordance with some embodiments. As depicted in FIG. 11, the per-stage gain is plotted for approximately 900 frames collected during a session. At 60 frames per second, this accounts for a session of approximately 15 seconds. The chart in FIG. 11 illustrates the gain for an encoder stage. Although the visualization 1100 only includes a plot of the per-stage gain for a single stage of the pipeline, the same chart can be used to plot the gain for multiple stages, with the line for each stage being differentiated by color or line type (e.g., dashed, center line, etc.). This visualization makes it easy to determine that an encoder stage of the pipeline is experiencing high latency variability.

Figure 12:
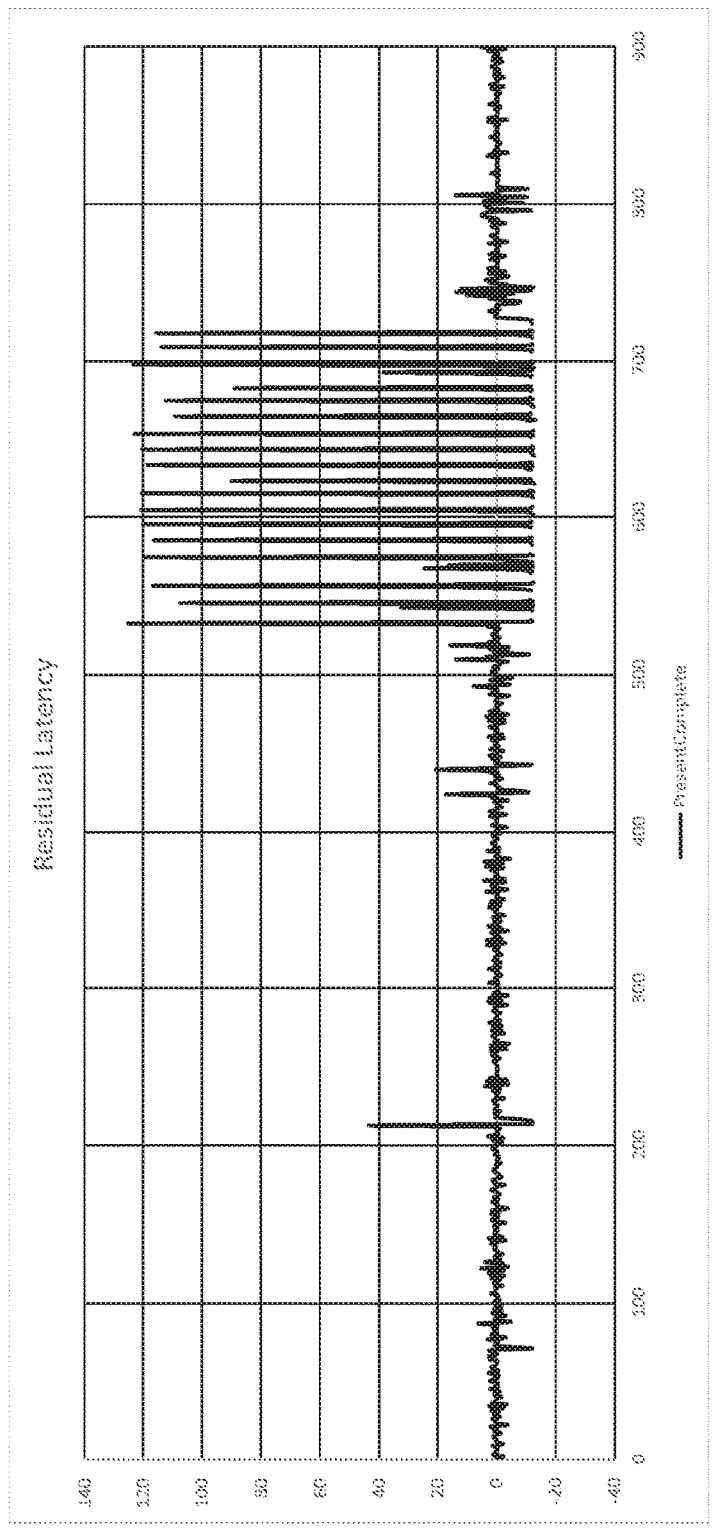
FIG. 12 illustrates a visualization of the per-stage residual latency during a session, in accordance with some embodiments.

FIG. 12 illustrates a visualization 1200 of the per-stage residual latency during a session, in accordance with some embodiments. The residual latency is plotted for a single stage of the pipeline. However, in other embodiments, the residual latency can be plotted for multiple stages on a single chart, with the line for each stage being differentiated by color or line type. As depicted in FIG. 12, the residual latency for a presentation complete stage (e.g., the final stage in the pipeline) peaks multiple times between approximately frames 500 and 750. Of course, it will be appreciated that residual latencies for other stages of the pipeline can be plotting in the chart in addition to or in lieu of the presentation complete stage.

In one embodiment, the developer can use a graphical user interface to select the stages of the pipeline to include in a particular visualization and the particular variable (e.g., gain, residual latency, etc.) to plot on the graph or chart. This enables the developer to focus on a small number of stages rather than see the cumulative total latency associated with the entire pipeline. In some embodiments, the stages included in the chart will be selected automatically. For example, the stage with the maximum absolute value of the selected parameter for any frame in the session will be included in the chart as well as any other stages of the pipeline having a similar parameter above a specified magnitude (e.g., 20% of the maximum absolute value).

Figure 13:
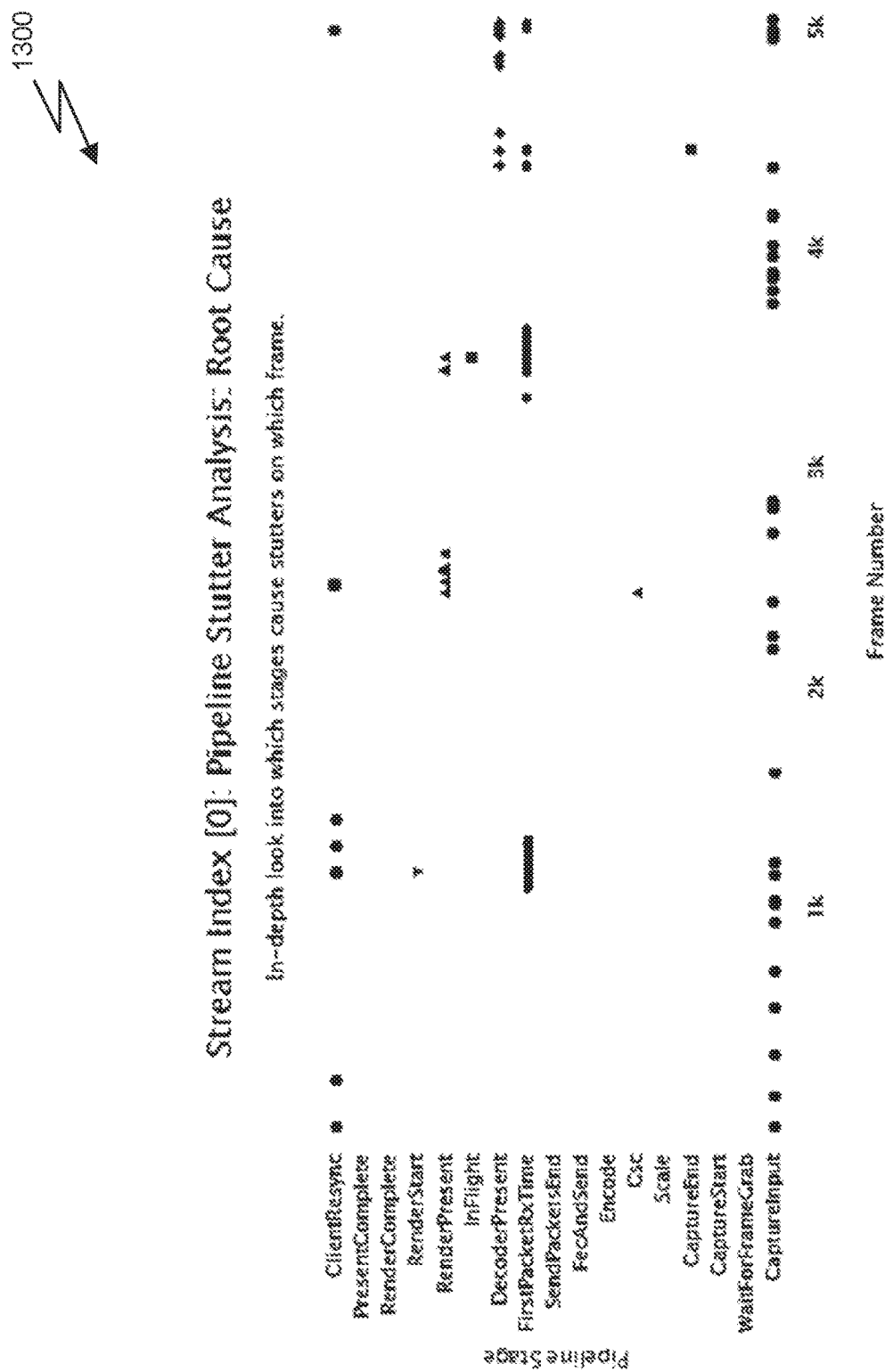
FIG. 13 illustrates a visualization of anomalies detected in the pipelined stack, in accordance with some embodiments.

FIG. 13 illustrates a visualization 1300 of anomalies detected in the pipelined stack, in accordance with some embodiments. The stages of the pipeline are listed on the y-axis of the graph and the frame numbers are plotted on the x-axis of the graph. The instances where the Count variable was incremented (e.g., where the per-stage gain for that frame is above a threshold value) for a particular stage is indicated on the chart. The visualization 1300 indicates succinctly how many times each stage is identified as a major source of the latency.

Figure 15:
FIG. 15 illustrates a visualization of a summary of the session, in accordance with some embodiments.

FIGS. 14A & 14B illustrate a visualization 1400 of a session analysis chart, in accordance with some embodiments. Visualizations 1100, 1200, and 1300 are all shown in graph formats. However, other information can be presented in the dashboard via a chart. The visualization 1400 includes a major stutter analysis (where the threshold is set at 4 ms), as shown in FIG. 14A, and a minor stutter analysis (where the threshold is set at 2 ms), as shown in FIG. 14B. Although the charts are shown on different sheets for ease of illustration, the charts can be displayed side by side on a single display screen of the dashboard. In other words, by running the analysis set forth in the pseudocode above multiple times using different parameters (e.g., threshold values) for each pass, different information can be gained and compared. For example, the parameter Th_2 can be set at 4 ms for a first pass to perform the major stutter analysis and set at 2 ms for a second pass to perform the minor stutter analysis. Such visualizations off insight to the developer FIG. 15 illustrates a visualization 1500 of a summary of the session, in accordance with some embodiments. The visualization 1500 is a chart that lists the stages of the pipelined stack 100 and a classification of each stage (e.g., a classification {Bad, Poor, Okay, Good, Perfect} on a scale between 1 and 5) selected for the stage. In some embodiments, the per-stage information related to per-frame gain or per-frame residual latency is not easily digestible at a glance. Therefore, in some embodiments, the dashboard may also provide a quick summary of a session to the developer that indicates the quality of the content stream during the session. The classifications of the stages on an easily digestible scale can provide a quick indicator of whether the developer should look into the detailed data for the session or move on to analysis of a different session. The visualization 1500 can also provide a quick indicator of which subset of stages are the likely source of the problems with a session. The classification can be determined using a formula based on the various metrics generated by the monitor 950.

The dashboard functionality described above is useful for subsequent analysis of the captured metadata related to a session. This allows a developer of the service to identify where bottlenecks in the pipeline are occurring and work to adjust algorithms in the code to solve those bottlenecks.

In some embodiments, the metadata can be used to adjust the pipelined stack 100 in real-time. As the metadata is collected by the client device 730, the metadata is transmitted back to the server device 710 and processed by an algorithm that utilizes the metadata to adjust operating parameters of one or more stages of the pipelined stack 100. For example, analysis of the metadata can indicate that the per-stage gain for the encoding stage is above a threshold value and, in response, one or more parameters of the encoding stage can be adjusted to attempt to correct the latency associated with the encoding stage. In some embodiments, the type of encoder (e.g., codec) used for encoding can be changed and/or particular parameters of the encoder can be changed. The result of changing these parameters might cause the bitrate of the encoded bit stream to increase (requiring more network bandwidth to transmit the bitstream), but the overall latency of the pipelined stack 100 may decrease as the server-side encoding latency decreases and the client-side decoding latency increases, for example.

As another example of adjusting parameters of the pipelined stack 100 automatically, the overall frame rate can be reduced from, e.g., 60 Hz to 30 Hz during periods of high network congestion by only capturing every other frame generated by the application. For example, when the metadata indicates that the network stage is the source of most of the latency, steps to reduce the overall bandwidth of the content stream can be taken such as reducing the resolution or bit depth of the video frames, reducing the frame rate, improving encoding efficiency, etc. When the metadata indicates that the network stage is no longer the source of most of the latency (e.g., network congestion has improved), then the parameters can be adjusted, increasing the frame rate, resolution, or bit depth of the content as needed to ensure a particular QoS.

Such dynamic adjustments to the pipeline stack 100 can help the service to deliver the highest quality content that the latency of the network 720 and/or the client device 730 allow while maintaining a given QoS. Similarly, the server device 710 can adjust the stages to decrease the quality of the content to try and improve speed on the server side 102 in order to reduce the overall latency of the pipeline.

It will be appreciated that the techniques described above are not limited to streaming video games or VR/AR applications. Any content that requires a pipelined stack implemented in a client-server framework and requiring some type of client-side feedback is contemplated as being within the scope of the disclosure. One application where the techniques that are described above could be used is in training of or inference with deep learning models in, e.g., autonomous vehicles or other applications. This invention can help identify the problem stages within such a pipeline with respect to the consistency of latency.

For example, an application on a server can be designed to generate simulated video that represents simulated images captured from a camera of an autonomous vehicle. The video frames can be delivered to a client device (e.g., an autonomous vehicle or an autonomous vehicle simulator) and used as input to a machine learning algorithm configured to generate control outputs for controlling the vehicle (e.g., steering inputs, throttle inputs, etc.). The control outputs generated by the machine learning algorithms, which would normally be used to drive the vehicle, are transmitted back to the server device in order to update the application and generate the next frame of simulated video, which is sent back to the autonomous vehicle to help provide inputs to the machine learning algorithm at a next time step. This allows for testing of multiple simulated scenarios to determine how the machine learning algorithm reacts without putting real people or property in jeopardy on the roads. In fact, this type of simulated system can enable thousands of virtual vehicles to be tested at once without requiring all of the necessary hardware of thousands of automated vehicles to be built and introduced to real-world driving conditions. The embodiments disclosed herein can be used to study latency associated with the pipeline for generating the simulated images in response to inputs (e.g., sensor signals) from the autonomous vehicle/simulator platform and generating outputs by the machine learning algorithm. In this case, the graphics pipeline for rendering images is located on the server-side of the pipeline, and the machine learning algorithm can be located on either the server-side or the client-side (e.g., in the autonomous vehicle) of the pipeline.

Furthermore, the solution of tracking stages in a pipeline using time stamps can be utilized in other applications that are not typically software-based. For example, a shipping company may track packages routed through a distribution network of the shipping company. An automated scanner can identify a package arriving at a stage of the distribution network and update metadata in a computer system associated with the stage. A time stamp can be added to the metadata when the package arrives at a stage of the distribution network and leaves the stage of the distribution network. The stages can include specific locations of the distribution network (e.g., processing centers, receiving centers, distribution hubs, delivery vehicles, and the destination). The delivery route of each package delivered to a particular address is a pipeline and multiple packages delivered through the same route are different instances of the metadata for the pipeline. A server device could collect the metadata for a particular delivery route for a large number of packages and measure the variable latency (e.g., change in transit times) for each stage of the delivery route. The visualization of this information could help the shipping company make capital improvements in certain locations to help improve delivery speed.

As yet another example, public transportation (e.g., trains, buses, etc.) may follow specific routes and have many stops along a given route. An automated system could be installed in the vehicles to log time stamps at each stop, with the route between adjacent stops representing each stage in the pipeline. Arriving at a given stop adds a new time stamp to metadata for a particular transit of the route and, over a number of transits, enough metadata is collected to determine whether there are problems with certain locations along the route that are causing delays in the total transit time. An individual could use the dashboard to see where along the route the issues are occurring and possibly adjust the route to ensure faster transit times.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system for monitoring latency variability in a pipeline, the system comprising:
    a server device including one or more processors configured to:
        receive, from a client device, metadata corresponding to content processed by a plurality of stages of the pipeline, wherein the metadata includes information corresponding to each stage of the plurality of stages of the pipeline, and wherein the content comprises a plurality of frames streamed to the client device during a session;
        calculate, for each frame of the plurality of frames, a gain for each stage of the pipeline;
        compare, for each frame of the plurality of frames, a total residual latency to a first threshold value to identify anomalous frames;
        calculate, for each stage of the pipeline, an aggregate value by summing a number of anomalous frames in the plurality of frames where the gain corresponding to the stage in the anomalous frame is greater than a second threshold value;
        generate, for each stage of the plurality of stages of the pipeline, a metric calculated based on the metadata, wherein the metric for a particular stage is calculated based on the aggregate value for the particular stage; and
        adjust a parameter associated with at least one stage of the pipeline based on the metrics for the plurality of stages.

2. The system of claim 1, wherein the one or more processors are further configured to:
    generate a visual representation based on the metrics.

3. The system of claim 1, wherein the gain for a particular stage is calculated based on an expected frame duration and a difference between a time stamp corresponding to the particular stage for the current frame and a time stamp corresponding to the particular stage for a previous frame.

4. The system of claim 3, wherein the pipeline generates the plurality of frames in accordance with a variable frame rate, and wherein the expected frame duration is set in accordance with a target frame rate.

5. The system of claim 1, wherein the metric for a particular stage is calculated by multiplying a rate of the gain for the particular stage exceeding the second threshold value by a mean of the gain for the particular stage over a duration of the session.

6. The system of claim 1, wherein the content comprises a frame of video rendered in response to a feedback signal received from the client device.

7. The system of claim 6, wherein the frame of video is rendered in accordance with a ray-tracing algorithm.

8. The system of claim 6, wherein the feedback signal includes at least one signal selected from the group consisting of:
    controller input; or
    sensor data from a head-mounted display.

9. The system of claim 1, wherein adjusting the parameter causes an encoding stage or a decoding stage of the pipeline to use a different encoding configuration or a different codec for encoding or decoding the content.

10. The system of claim 1, wherein the information corresponding to each stage of the pipeline comprises a time stamp that indicates a time when the processing of the content by the stage is complete.

11. The system of claim 1, wherein each stage includes one or more components and at least one stage includes a plurality of components, and wherein information corresponding to a particular stage of the pipeline comprises a time stamp for each component of the particular stage that indicates a time when the processing of the content by the component is complete.

12. The system of claim 1, wherein the pipeline includes at least one stage selected from the group consisting of: a frame capture stage, an encoding stage, a forward error correction (FEC) stage, a transmit stage, a network stage, a decoding stage, a resynchronization stage, or a display stage.

13. The system of claim 1, wherein the client device is configured to train a neural network for an autonomous vehicle, and wherein the server device is operable to generate simulated camera signals, representative of camera signals captured by the autonomous vehicle, in response to control inputs received from the autonomous vehicle.

14. A method, comprising:
    receiving, from a client device, metadata corresponding to content processed by a plurality of stages of a pipeline, wherein the metadata includes information corresponding to each stage of the plurality of stages of the pipeline, and wherein the content comprises a plurality of frames streamed to the client device during a session;
    calculating, for each frame of the plurality of frames, a gain for each stage of the pipeline;
    comparing, for each frame of the plurality of frames, a total residual latency to a first threshold value to identify anomalous frames;

calculating, for each stage of the pipeline, an aggregate value by summing a number of anomalous frames in the plurality of frames where the gain corresponding to the stage in the anomalous frame is greater than a second threshold value;

generating, for each stage of the plurality of stages of the pipeline, a metric calculated based on the metadata, wherein the metric for a particular stage is calculated based on the aggregate value for the particular stage; and adjusting a parameter associated with at least one stage of the pipeline based on the metrics for the plurality of stages.

15. The method of claim 14, the method further comprising:

generating a visual representation based on the metrics.

16. The method of claim 14, wherein the gain for a particular stage is calculated based on an expected frame duration and a difference between a time stamp corresponding to the particular stage for the current frame and a time stamp corresponding to the particular stage for a previous frame.

17. The method of claim 14, wherein the metric for a particular stage is calculated by multiplying a rate of the gain for the particular stage exceeding the second threshold value by a mean of the gain for the particular stage over a duration of the session.

18. The method of claim 14, wherein the content comprises a frame of video rendered in response to a feedback signal received from the client device, and wherein the feedback signal includes at least one signal selected from the group consisting of:

controller input; or sensor data from a head-mounted display.

19. The method of claim 14, wherein the information corresponding to each stage of the pipeline comprises a time stamp that indicates a time when the processing of the content by the stage is complete.

20. A non-transitory computer-readable media storing computer instructions that, when executed by one or more processors, cause the one or more processors to perform steps comprising:

receiving, from a client device, metadata corresponding to content processed by a plurality of stages of a pipeline, wherein the metadata includes information corresponding to each stage of the plurality of stages of the pipeline, and wherein the content comprises a plurality of frames streamed to the client device during a session;

calculating, for each frame of the plurality of frames, a gain for each stage of the pipeline;

comparing, for each frame of the plurality of frames, a total residual latency to a first threshold value to identify anomalous frames;

calculating, for each stage of the pipeline, an aggregate value by summing a number of anomalous frames in the plurality of frames where the gain corresponding to the stage in the anomalous frame is greater than a second threshold value;

generating, for each stage of the plurality of stages of the pipeline, a metric calculated based on the metadata, wherein the metric for a particular stage is calculated based on the aggregate value for the particular stage; and adjusting a parameter associated with at least one stage of the pipeline based on the metrics for the plurality of stages.

* * * * *